US010795059B2

(12) United States Patent
Petersen et al.

(10) Patent No.: US 10,795,059 B2
(45) Date of Patent: Oct. 6, 2020

(54) ULTRA THIN FRESNEL LENSES AND OTHER OPTICAL ELEMENTS

(71) Applicant: Wavefront Technology, Inc., Paramount, CA (US)

(72) Inventors: Joel Mikael Petersen, Valley Village, CA (US); Christopher Chapman Rich, Rancho Palos Verdes, CA (US)

(73) Assignee: WAVEFRONT TECHNOLOGY, INC., Paramount, CA (US)

( * ) Notice: Subject to any disclaimer, the term of this patent is extended or adjusted under 35 U.S.C. 154(b) by 158 days.

(21) Appl. No.: 15/655,567

(22) Filed: Jul. 20, 2017

(65) Prior Publication Data

US 2019/0025474 A1    Jan. 24, 2019

(51) Int. Cl.
*G02B 3/08* (2006.01)
*G02B 3/00* (2006.01)
G02B 5/09 (2006.01)

(52) U.S. Cl.
CPC ............. *G02B 3/08* (2013.01); *G02B 3/0043* (2013.01); *G02B 3/0056* (2013.01); *G02B 5/09* (2013.01); *G02B 2003/0093* (2013.01)

(58) Field of Classification Search
CPC ...... G02B 3/08; G02B 3/0043; G02B 3/0056; G02B 2003/0093; G02B 5/045; G02B 5/1876; G02B 19/0076; G02B 25/002; G02B 13/0085; G02B 19/0009; G02B 19/0014; G02B 19/0042; G02B 19/009; G02B 1/04; G02B 27/027; G02B 27/0927; G02B 27/0972; G02B 5/1895; G02B 7/02; G02B 13/006; G02B 19/0028; G02B 1/041; G02B 1/14; G02B 25/008; G02B 27/1066; G02B 27/126; G02B 27/4272; G02B 3/0037; G02B 3/005; G02B 3/06;

(Continued)

(56) References Cited

U.S. PATENT DOCUMENTS 3,330,908 A    7/1967 Good et al.
3,661,385 A    5/1972 Scheider
(Continued)

FOREIGN PATENT DOCUMENTS

EP    1 183 569    3/2005
JP    2003-131607    5/2003
(Continued)

OTHER PUBLICATIONS

International Search Report and Written Opinion received in PCT Application No. PCT/US2018/042330, dated Oct. 1, 2018 in 10 pages.

(Continued)

*Primary Examiner* — Collin X Beatty
*Assistant Examiner* — Grant A Gagnon
(74) *Attorney, Agent, or Firm* — Knobbe, Martens, Olson & Bear LLP

(57) ABSTRACT

Ultra thin Fresnel lenses and methods of forming the same are described herein. An optical element comprising an ultra thin Fresnel lens includes a plurality of Fresnel elements formed on a surface of a substrate. Each of the plurality of Fresnel surface elements has an angled facet portion and a shallow or substantially horizontal portion. The Fresnel surface elements can be formed, for example, by a hot stamp or cold transfer method.

24 Claims, 15 Drawing Sheets

(58) Field of Classification Search
CPC .... G02B 5/1814; G02B 6/0006; G02B 6/003;
G02B 6/4206; G02B 7/028; G02B
13/001; G02B 13/0025; G02B 13/0035;
G02B 13/0055; G02B 13/0065; G02B
13/007; G02B 13/18; G02B 19/0033;
G02B 19/0061; G02B 1/10; G02B 1/105;
G02B 1/111; G02B 1/118; G02B 1/12;
G02B 1/18; G02B 2005/1804; G02B
2027/015; G02B 21/0032; G02B 23/243;
G02B 25/005; G02B 25/007; G02B
26/0833; G02B 26/0875; G02B 27/0006;
G02B 27/0018; G02B 27/0025; G02B
27/0037; G02B 27/0101; G02B 27/02;
G02B 27/021; G02B 27/022; G02B
27/025; G02B 27/026; G02B 27/028;
G02B 27/04; G02B 27/0944; G02B
27/0966; G02B 27/10; G02B 27/123;
G02B 27/2214; G02B 27/2292; G02B
27/30; G02B 27/4238; G02B 27/4261;
G02B 27/4277; G02B 27/4283; G02B
3/0012; G02B 3/0031; G02B 3/0062;
G02B 3/0068; G02B 3/0075; G02B 3/02;
G02B 3/10; G02B 3/12; G02B 3/14;
G02B 5/003; G02B 5/02; G02B 5/0215;
G02B 5/0236; G02B 5/0242; G02B
5/0278; G02B 5/09; G02B 5/10; G02B
5/1833; G02B 5/1857; G02B 5/1861;
G02B 5/1871; G02B 5/30; G02B 5/3041;
G02B 6/0016; G02B 6/0018; G02B
6/0028; G02B 6/0051; G02B 6/32; G02B
6/4214; G02B 6/425; G02B 6/43; G02B
7/023; G02B 9/12; G02B 9/34
USPC .......................................................... 359/742
See application file for complete search history.

(56) References Cited

U.S. PATENT DOCUMENTS

| 4,492,442 A | 1/1985 | Gaudyn |
| 4,871,233 A | 10/1989 | Sheiman |
| 5,074,649 A | 12/1991 | Hamanaka |
| 5,130,852 A | 7/1992 | Hamanaka |
| 5,177,637 A | 1/1993 | Tsukada |
| 5,439,621 A | 8/1995 | Hoopman |
| 5,712,731 A | 1/1998 | Drinkwater et al. |
| 5,751,387 A | 5/1998 | Iigahama et al. |
| 5,956,164 A | 9/1999 | Waitts |
| 6,014,259 A | 1/2000 | Wohlstadter |
| 6,339,506 B1 | 1/2002 | Wakelin et al. |
| 6,381,071 B1 | 4/2002 | Dona et al. |
| 6,624,934 B1 | 9/2003 | Moshrefzadeh et al. |
| 6,700,712 B2 | 3/2004 | Servatius et al. |
| 6,800,357 B2 | 10/2004 | Keberlein |
| 7,298,533 B2 | 11/2007 | Petersen et al. |
| 2003/0124435 A1 | 7/2003 | Rich et al. |
| 2004/0047037 A1 | 3/2004 | Peterson et al. |
| 2005/0141087 A1 | 6/2005 | Yoshida |
| 2005/0180004 A1 | 8/2005 | Sekiguchi |
| 2005/0200953 A1 | 9/2005 | Sekiguchi et al. |
| 2006/0245055 A1 | 11/2006 | Peterson et al. |
| 2010/0085642 A1 | 4/2010 | Drinkwater |
| 2011/0007505 A1 | 1/2011 | Wang |
| 2015/0109675 A1* | 4/2015 | Karri .................. G02B 1/11 359/619 |
| 2015/0205139 A1 | 7/2015 | Weber et al. |
| 2016/0223815 A1 | 8/2016 | Dobschal et al. |

FOREIGN PATENT DOCUMENTS

| WO | WO 2014/061730 | 4/2014 |
| WO | WO 2019/018307 | 1/2019 |

OTHER PUBLICATIONS

Guyenot, et al., "Novel Micro-Optical Components Made from Optical Adhesives", Proceedings of SPIE vol. 3135, Precision Plastic Optics for Optical Storage, Displays, Imaging, and Communications, Sep. 1997, pp. 106-111.

Hessler, et al., "Microlens Arrays with Spatial Variation of the Optical Functions", Pure and Applied Optics 6, 1997, pp. 673-681.

Supplementary European Search Report received in European Application No. 18835205.8, dated May 29, 2020 in 4 pages.

Official Communication received in European Application No. 18835205.8, dated Jun. 12, 2020 in 27 pages.

* cited by examiner

ULTRA THIN FRESNEL LENSES AND OTHER OPTICAL ELEMENTS

BACKGROUND

Field

The present invention relates to thin, for example, ultra thin, optical elements such as Fresnel lenses and other optical elements and methods of manufacturing the same.

Description of the Related Art

Fresnel lenses are increasingly used as decorative elements in product packaging, for example, in packaging for consumer goods such as DVD covers, tissue boxes, toiletry items, toys, and more. These Fresnel lenses can be incorporated into decorative films to create a desirable reflective metallic, textured, or "bubbled," appearance. The thickness of such Fresnel lenses can be between about 5 microns and about 25 microns. Producing even thinner Fresnel lenses can be desirable because some thinner substrates, such as some types of thin product packaging, cannot adequately support typical Fresnel lenses. Additionally, thinner Fresnel lenses may potentially use less material to produce and therefore may be lower cost than typical Fresnel lenses.

Accordingly, there is a need for methods of producing thin Fresnel lenses.

SUMMARY

Various examples optical elements are disclosed herein. Such examples include but are not limited to the following Examples 1-79.

1. An optical element, said optic element having first and second surfaces separated from each other in a vertical direction, said optical element comprising:
   a plurality of Fresnel lens elements spaced in a horizontal direction with respect to each other, said plurality of Fresnel lens elements comprising angled facet portions and substantially horizontal portions, said plurality of Fresnel lens elements closer in said vertical direction to said first surface than said second surface,
   wherein said angled facet portion has a depth that is on average less than about 5 microns.

2. The optical element of Example 1, wherein the depth is on average less than about 2.5 microns.

3. The optical element of any of the above Examples, wherein the depth is on average less than about 1 micron.

4. The optical element of any of the above Examples, wherein the vertical distance from (i) points of the angled facet portion closest to said second surface to (ii) the part of the closest substantially horizontal portion farthest from the second surface is on average less than 5 microns.

5. The optical element of any of the above Examples, wherein the vertical distance from (i) points of the angled facet portion closest to said second surface to (ii) the part of the closest substantially horizontal portion farthest from the second surface is on average less than 2.5 microns.

6. The optical element of any of the above Examples, wherein the vertical distance from (i) points of the angled facet portion closest to said second surface to (ii) the part of the closest substantially horizontal portion farthest from the second surface is on average less than 1 micron.

7. The optical element of any of the above Examples, wherein a minimum spacing of the plurality of Fresnel lens elements is greater than or equal to 4 microns.

8. The optical element of any of the above Examples, wherein the spacing of the plurality of Fresnel lens elements on average increases from a portion of the optical element to another portion of the optical element.

9. The optical element of any of the above Examples, wherein the spacing of the plurality of Fresnel lens elements on average decreases from a portion of the optical element to another portion of the optical element.

10. The optical element of any of the above Examples, wherein the spacing of the plurality of the Fresnel lens elements on average decreases from a central portion of the optical element to a peripheral portion of the optical element.

11. The optical element of any of the above Examples, wherein an angle of the angled facet portion of the Fresnel lens elements on average increases from a portion of the optical element to another portion of the optical element.

12. The optical element of any of the above Examples, wherein an angle of the angled facet portion of the Fresnel lens elements on average decreases from a portion of the optical element to another portion of the optical element.

13. The optical element of any of the above Examples, wherein an angle of the angled facet portion of the Fresnel lens elements on average increases from a central portion of the optical element to a peripheral portion of the optical element.

14. The optical element of any one of Examples 8 to 13, the average increase or decrease occurs over 5 to 10 consecutive Fresnel lens elements.

15. The optical element of any one of Examples 8 to 13, the average increase or decrease occurs over 10 to 15 consecutive Fresnel lens elements.

16. The optical element of any one of Examples 8 to 13, the average increase or decrease occurs over 15 to 20 consecutive Fresnel lens elements.

17. The optical element of any one of the above Examples, wherein the plurality of Fresnel lens elements comprise indentions in a surface of a layer of material that coincides with said facets.

18. The optical element of Example 17, wherein said layer of material comprises a layer of transparent material.

19. The optical element of Example 17 or 18, wherein said layer of material comprises a layer of polymer.

20. The optical element of any one of Examples 17 to 19, wherein said layer of material comprises a layer of polyester, polycarbonate, polypropylene, and acrylic.

21. The optical element of any one of Examples 17 to 20, wherein said layer of material comprises a layer of cured adhesive material.

22. The optical element of any one of the above Examples, wherein the plurality of Fresnel elements comprise a layer of metal formed on a surface of material having indentations formed therein coinciding with said facets.

23. The optical element of Example 22, further comprising a layer of material over said layer of metal.

24. The optical element of Example 23, wherein the layer of material over said layer of metal comprises transparent material.

25. The optical element of Example 23 or 24, wherein layer of material over said layer of metal comprises polymer.

26. The optical element of any of Examples 23 to 25, wherein said layer of material over said layer of metal comprises cured adhesive.

27. The optical element of any of Examples 23 to 26, wherein said layer of material over said layer of metal includes a substrate.

28. The optical element of any of Examples 1 to 27, wherein said facets are planar.

29. The optical element of any of Examples 1 to 27, wherein said facets are non-planar.

30. The optical element of Example 29, wherein said facets curve away from said second surface.

31. The optical element of Example 29, wherein said facets curve toward from said second surface.

32. The optical element of any of the above Examples, wherein said Fresnel elements are annular.

33. The optical element of any of the above Examples, wherein said facets are annular.

34. The optical element of any of the above Examples, wherein said substantially horizontal portions are annular.

35. The optical element of any one of Examples 32 to 34, wherein an angle of the angled facet portion of annular Fresnel surface elements varies with respect to the center of curvature of the annular Fresnel surface element.

36. The optical element of any of Examples 1 to 35, wherein said optical element comprise a single Fresnel lens.

37. The optical element of any of Examples 1 to 35, wherein said optical element comprises a plurality of Fresnel lenses.

38. The optical element of any of Examples 1 to 37, wherein said Fresnel lens elements form a spiral cut.

39. The optical element of any of Examples 1 to 37, wherein said Fresnel lens elements are cylindrical.

40. The optical element of Example 39, wherein said Fresnel lens elements are linear.

41. The optical element of any of the above Examples, wherein said Fresnel lens elements comprise an array of parallel Fresnel lens elements.

42. The optical element of any of the above Examples, wherein said Fresnel lens elements are undulating.

43. The optical element of any of Examples 1 to 42, wherein said optical element is mostly reflective.

44. The optical element of any of Examples 1 to 42, wherein said optical element is mostly optically transmissive.

45. The optical element of any of the above Examples, wherein said substantially horizontal portions are wider than said angled facet portions.

46. The optical element of any of the above Examples, wherein said substantially horizontal portions cover more area than said angled facet portions.

47. The optical element of any of the above Examples, wherein said substantially horizontal portions have a width that extends over 60% or more of the spacing between the Fresnel lens elements and said angled facet portion have a width that extends over 40% or less of the spacing between the Fresnel lens elements.

48. The optical element of any of the above Examples, wherein said substantially horizontal portions have a width that extends over 70% or more of the spacing between the Fresnel lens elements and said angled facet portions have a width that extends over 30% or less of the spacing between the Fresnel lens elements.

49. The optical element of any of the above Examples, wherein said substantially horizontal portions have a width that extends over 80% or more of the spacing between the Fresnel lens elements and said angled facet portions have a width that extends over 20% or less of the spacing between the Fresnel lens elements.

50. The optical element of any of the above Examples, wherein said substantially horizontal portions have a width that extends over 90% or more of the spacing between the Fresnel lens elements and said angled facet portions have a width that extends over 10% or less of the spacing between the Fresnel lens elements.

51. The optical element of any one of the above Examples, wherein the optical element is formed by a hot stamp process.

52. The optical element of any one of the above Examples, wherein the optical element is formed by a cold transfer process.

53. The optical element of any one of the above Examples, further comprising a substrate.

54. The optical element of any one of the above Examples, wherein said plurality of Fresnel lens elements are formed in a layer of material disposed on a substrate.

55. The optical element of Example 53 or 54, wherein the substrate comprises a polymer material.

56. The optical element of any of Examples 53 to 55, wherein the substrate comprises a material selected from one of polyester, polycarbonate, polypropylene, and acrylic.

57. The optical element of any of Examples 53 to 56, wherein the substrate comprises a package for a product.

58. The optical element of any of Examples 53 to 57, wherein the substrate comprises paper, paper board or another type of paper product.

59. The optical element of any one of the above Examples, wherein white light incident upon the optical element is not substantially dispersed by the optical element.

60. The optical element of any one of the above Examples, wherein dispersion of white light incident upon the optical element is not prominent.

61. The optical element of any of the above Examples, wherein said Fresnel lens elements comprise an array of Fresnel lens elements.

62. The optical element of Example 61, wherein said Fresnel lens elements comprise Fresnel lens elements having positive optical power and Fresnel lens elements having negative optical power.

63. The optical element of Example 62, wherein said Fresnel lens elements alternate between Fresnel lens elements having positive optical power and Fresnel lens elements having negative optical power.

64. An optical element, said optic element having first and second surfaces separated from each other in a vertical direction, said optical element comprising:
   a plurality of Fresnel lens element portions spaced in a horizontal direction with respect to each other, said plurality of Fresnel lens element portions comprising an angled facet section and a substantially horizontal section, said plurality of Fresnel lens element portions closer in said vertical direction to said first surface than said second surface,
   wherein a vertical distance from (i) points of the angled facet section closest to said second surface to (ii) the part of the closest substantially horizontal section farthest from the second surface is on average less than about 5 microns.

65. The optical element of Example 64, wherein said Fresnel lens element portions form a spiral cut.

66. An optical element having top and bottom surfaces extending across a length, said optical element comprising:
   a plurality of Fresnel lens elements comprising an angled facet portion having an angle $\alpha$ with respect to said length of said optical element and a shallow portion having an angle less than $\alpha$, said plurality of Fresnel surface elements closer to said top surface than said bottom surface, wherein a height from a bottommost point of the angled facet portion to a topmost surface of the shallow portion of the plurality of Fresnel lens elements is on average less than about 5 microns.

67. An optical element comprising:
a plurality of Fresnel lens elements spaced in a horizontal direction with respect to each other, said plurality of Fresnel lens elements comprising a plurality of indentations in a layer of material and a plurality an angled facet portions coinciding with said indentations and a plurality of substantially horizontal portions between said indentations,
wherein said substantially horizontal portions have widths in the horizontal direction greater than an adjacent one of said angled facet portions.

68. The optical element of Example 67, wherein said substantially horizontal portions cover more area than one of said adjacent angled facet portions.

69. The optical element of any of Example 67 or 68, wherein said substantially horizontal portions have widths that extends over 60% or more of the spacing between the Fresnel lens elements and said angled facet portions have widths that extends over 40% or less of the spacing between the Fresnel lens elements.

70. The optical element of any of Examples 67-69, wherein said substantially horizontal portions have widths that extends over 70% or more of the spacing between the Fresnel lens elements and said angled facet portion have widths that extends over 30% or less of the spacing between the Fresnel lens elements.

71. The optical element of any of Examples 67-70, wherein said substantially horizontal portion have widths that extends over 80% or more of the spacing between the Fresnel lens elements and said angled facet portion have widths that extends over 20% or less of the spacing between the Fresnel lens elements.

72. The optical element of any of Examples 67-71, wherein said substantially horizontal portion have widths that extends over 90% or more of the spacing between the Fresnel lens elements and said angled facet portion have widths that extends over 10% or less of the spacing between the Fresnel lens elements.

73. The optical element of any of Examples 67-72, wherein an minimum spacing of the plurality of Fresnel lens elements is greater than about 4 microns.

74. The optical element of any of the above Examples, wherein the average spacing of the plurality of Fresnel lens elements is 4 microns or more.

75. The optical element of any of the above Examples, wherein the minimum spacing of at least 10 consecutive Fresnel lens elements is 4 microns or more.

76. The optical element of any of the above Examples, wherein the minimum spacing of at least 20 consecutive Fresnel lens elements is 4 microns or more.

77. The optical element of any of the above Examples, wherein the minimum spacing of at least 30 consecutive Fresnel lens elements is 4 microns or more.

78. The optical element of any of the above Examples, wherein the minimum spacing of at least 40 consecutive Fresnel lens elements is 4 microns or more.

79. The optical element of any of the above Examples, wherein the minimum spacing of at least 50 consecutive Fresnel lens elements is 4 microns or more.

BRIEF DESCRIPTION OF THE DRAWINGS

FIG. 3A shows the Fresnel lens elements comprising a plurality of angled facet portions and substantially horizontal portions.

FIG. 3C shows the Fresnel lens elements comprising a plurality of angled facet portions and substantially horizontal portions.

The drawings herein may not be to scale.

DETAILED DESCRIPTION

Figure 1A:
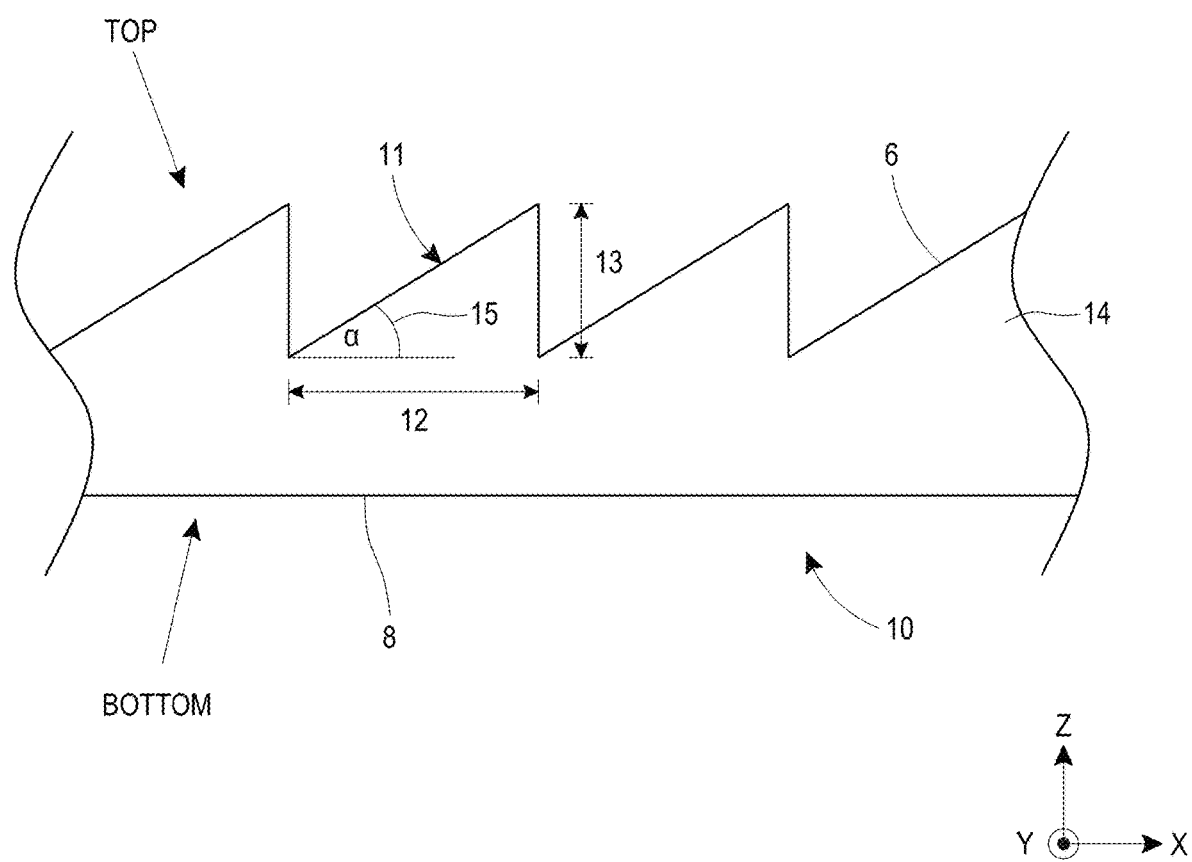
FIGS. 1A and 1B are cross-sectional and top views schematically illustrating a Fresnel lens.

Fresnel lenses can provide focusing, magnification, imaging etc. like a traditional concave or convex lens, however, a Fresnel lens can be made thinner with the use of facets. The Fresnel lenses have a relatively flattened spatial extent in comparison to traditional concave or convex lenses. FIG. 1A shows a cross-section of an example Fresnel lens 10. FIG. 1A shows a first side and a second side of the Fresnel lens 10 referred to as the top side and the bottom side. The Fresnel lens 10 includes a plurality of facets 11. The facets 11 are disposed on the first side (e.g., top side) on a top surface 6 and are closer to the first side (top side) than to the second side (bottom side) and bottom surface 8. Accordingly, the term top side may be referred to as the side where the facets are formed or are closest, in comparison to the bottom side.

Figure 1B:
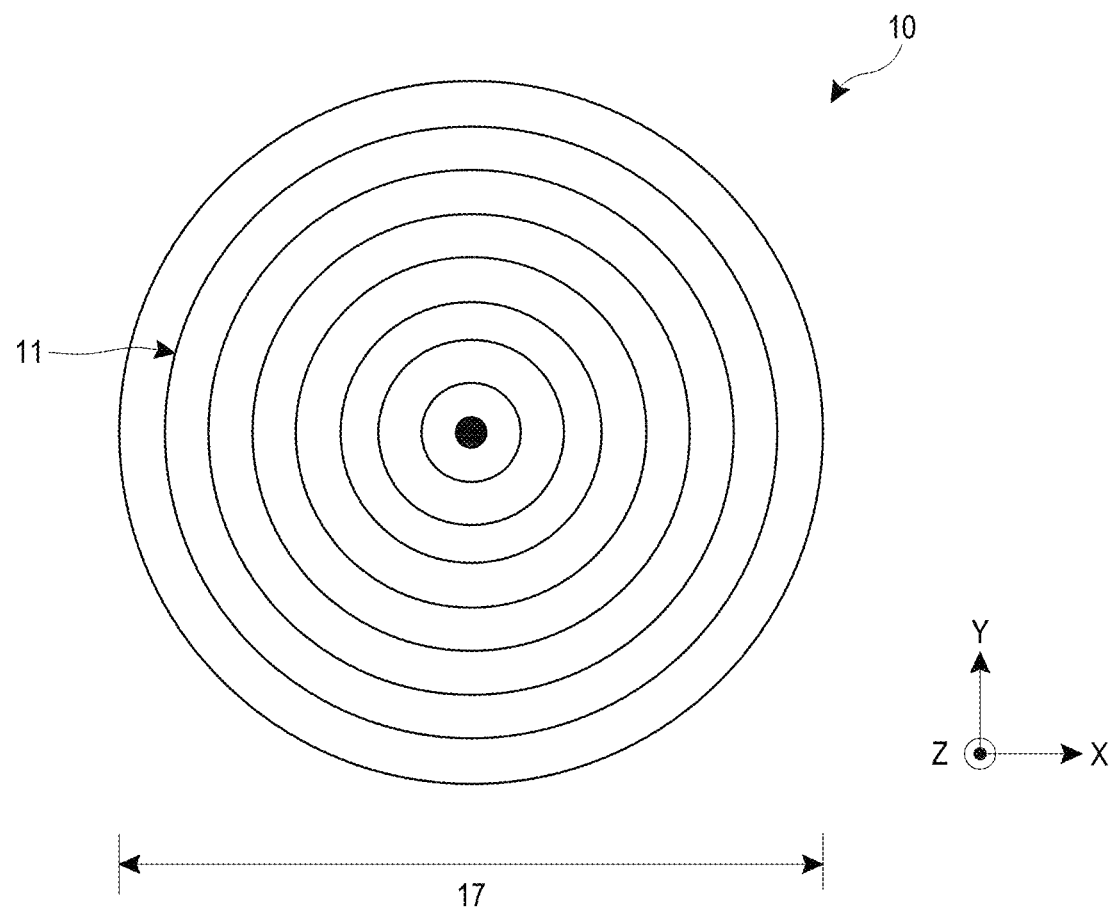

As illustrated in FIG. 1B, Fresnel lenses 10 may comprise a plurality of concentric or circular rings 11, also referred to as facets or elements. These rings or annular elements 11 may be circular or possibly stretched in one direction (e.g., elliptical) and may comprise may comprise refractive (or reflective) surfaces having local curvature and/or facet inclination/declination similar to that of a corresponding plano-convex or plano-concave refractive lens (or reflective mirror) so as to refract (or reflect) light in a manner similar to such a conventional non-Fresnel lens (or mirror). The Fresnel lens 10, however, can be made thinner than the corresponding plano-convex or plano-concave (non-Fresnel) lens by removing much of the thickness of the lens. The Fresnel lenses rings, facets or elements 11 can be formed on the surface 6 of a layer of material 14. The layer of material 14 can be optically reflective, or can be optically transmissive or transparent. The Fresnel lens 10 can thus provide optical power similar to a conventional lens or mirror. This optical power results from refraction or reflection of light from the facets 11. The Fresnel lens 10 however can be thinner than non-Fresnel lens based optical elements.

As discussed above, producing thinner Fresnel lenses 10 may be advantageous because some thinner substrate carriers, such as some types of thin product packaging, may not be able to adequately support the Fresnel lenses. Additionally, thinner Fresnel lenses 10 may use less material to produce and therefore can be lower cost than typical Fresnel lenses.

Thinner Fresnel lenses 10 may be fabricated by scaling down the size of the facets 11 or facet spacing. However, if the facets 11 are scaled down, as the thickness of a Fresnel lens 10 decreases, the spacing 12 between the facets that make up the Fresnel lens or optical element will also decrease. Accordingly, if the Fresnel lens thickness and thus the height 13 of the facets 11 is reduced too much, then the space 12 between each facet will become small enough to cause visible dispersion. In particular, the spacing 12 between the facets 11 will be at a size such that the facets diffract visible light resulting in wavelength dispersion and a resultant rainbow color effect. This dispersion of incident light can cause undesirable colors (such as a rainbow of colors) to be visible and can reduce or impair the desired achromatic or "metallic" look of the Fresnel lens. Accordingly, there is a need for Fresnel lenses 10 that are thinner, but that do not produce undesirable wavelength dispersion and the resultant colors and that can maintain their desirable achromatic or "metallic" look.

The average lateral dimension, or spacing 12 of each of the Fresnel rings 11, for example, can be from 0.5 micron to 1000 microns, e.g., between about 5 microns to about 25 microns or larger in some cases. As illustrated in FIGS. 1A and 1B, this lateral dimension 12 is in the direction parallel, for example, to the x (or y) axes and in the horizontal direction (as opposed to, for example, the direction parallel to the z axis and in the vertical direction). The average lateral spacing 12 may also be referred to as the frequency or period of the Fresnel lens 10. The Fresnel rings 11 have a height or depth 13 in the vertical direction (shown in FIG. 1A as parallel to the z axis). In some cases, the height 13 may be maintained constant and the spacing 12 may change, for example, with radial distance from the center of the Fresnel rings 11 and Fresnel lens 10 toward the periphery. For example, the spacing 12 may be larger at the center and progressively get smaller at the edges or periphery. As a result, the facet angle, α, may increase with radial distance from the center. With larger spacing 12, the Fresnel lens 10 may be achromatic and not produce diffraction of visible light that creates a rainbow effect. In contrast, for a Fresnel lens 10 having a minimum spacing 12 less than, for example, about 4 microns incident visible light may be undesirably diffracted by the Fresnel rings 11 and this diffraction may be wavelength dependent, causing different colors to be diffracted by different amount. As a result, colored light may be visible. Likewise, this dispersion can cause the Fresnel lens 10 to appear colored (e.g., a rainbow of colors may be observable) as opposed to the typically desired achromatic or metallic appearance, where substantially no color dispersion of incident light occurs. These colors caused by the dispersion may be a prominent feature observable to the viewer.

For certain Fresnel lenses, the average spacing 12 of each of the Fresnel rings or elements 11 is related to the height 13, also referred to as the facet height or facet depth, of the of each of the Fresnel elements 11. For example, decreases in the height 13 of the Fresnel elements 11 by making the lens smaller are associated with a related decrease in the average spacing 12. Accordingly, to decrease the facet height 13 of the Fresnel lens 10 below a certain desired threshold, about 2.5 microns or 1 micron, for example, the size of the Fresnel lens may be scaled down causing the minimum spacing 12 to be below the spacing at which color dispersion of incident light occurs as a result of diffraction.

Referring again to FIG. 1B, the surface elements 11 may comprise a plurality of concentric rings. The Fresnel lens 10 may be, for example, about 0.1 to 20 inches, for example, 0.25 to 6 inches or larger in diameter 17 or any range or combination or ranges defined by any of these values. The facet height 13 may be, for example, from about 0 microns or 1 micron to 1000 microns, e.g., from about 5 to about 25 microns or larger, in some cases. For the Fresnel lens 10, including a plurality of annular elements 11, the primary optical facet angle, $\alpha$, 15, may vary monotonically with respect to the distance of the element 11 from the center of curvature of the circular element 11 (or varies monotonically with respect to the radius of curvature of the element 11 and/or distance from the center of the Fresnel lens) although the configuration need not be so limited. In some embodiments the Fresnel lens 10 may have a focal length (and corresponding f-number). In some cases, both the height 13 and the spacing 12 vary together, for example, to maintain a focal length of the Fresnel lens 10. The variation of the primary optical facet angle, $\alpha$, 15, can be monotonically increasing or decreasing with respect to the radius of curvature of the element 11. For example, the primary optical facet angle, $\alpha$, 15 can vary quadratically or parabolically with respect to the radius of curvature of the element 11. The primary optical facet angle, $\alpha$, 15 can vary as a polynomial function (e.g., Bessel or Zernike polynomial function) with respect to the radius of curvature of the element 11. The variation in the primary optical facet angle, $\alpha$, 15, however, is not so limited and may vary according to other profiles and need not be monotonically increasing or decreasing.

The variation in the primary optical facet angle, $\alpha$, 15, can be produced by variation in the spacing 12 of the Fresnel rings or elements 11 or variation in the height 13 of the Fresnel rings or elements 11 of both. For example, the spacing 12 of the Fresnel rings or elements 11 can change, e.g., increase or decrease, while the height 13 of the Fresnel rings or elements 11 generally remains constant. The spacing 12 of the Fresnel rings or elements 11 may monotonically increase or decrease with respect to the radius of curvature of the element 11 while the height or depth of the Fresnel rings or elements remains substantially constant. As a result, the primary optical facet angle, $\alpha$, 15, may change, increase or decrease, for example, monotonically increase or decrease respect to the radius of curvature of the element 11 and/or distance from the center of the Fresnel lens toward the periphery. Such variation may be configured to provide for the focal length of the Fresnel lens.

As illustrated in FIG. 2, an optical element 20, may comprise an "ultra" thin optical element such as an ultra thin Fresnel lens comprising a plurality of rings or elements 21 formed on the surface 6 of a layer of material 24. An element 21 may comprise an angled facet portion 21A and a shallower portion or substantially horizontal portion 21B. As used herein, the term horizontal is used for reference only, however, such a portion 21B may not be oriented horizontally in use. In FIG. 2, the horizontal direction is parallel to the x axis (or y axis) as designed by the x, y, z axes. In some embodiments, the shallower portion or substantially horizontal portion 21B may be substantially horizontal with respect to the surface of the layer or film 24 onto which the annular Fresnel element 21 is formed. In some embodiments, the top surface of the substantially horizontal portion 21B may be the top surface 6 of the layer or film 24 on which the Fresnel element 21 is formed. In various implementations, a plurality of elements 21 extend in a horizontal direction across the layer of material or film 24.

In some implementations, the shallower portion or substantially horizontal portion 21B varies in size such as width $W_{Horiz}$ with position, for example, with distance from a location such as the center of the Fresnel lens or some other location. In some implementations, the shallower portion or substantially horizontal portion 21B varies in size as the facet size varies. For example, the shallower portion or substantially horizontal portion 21B may vary in size (e.g., width $W_{Horiz}$) as the angled facet portion 21A varies such as width $W_{Facet}$ in size. In some implementations, the height or depth 23 remains constant as the shallower portion or substantially horizontal portion 21B and/or angled facet portion 21A varies in width $W_{Horiz}$, $W_{Facet}$.

The angled facet portion 21A of the Fresnel lens element 21 may have an optical facet angle $\alpha$, 25, which may be substantially similar to the optical facet angle $\alpha$, 15 of the Fresnel lens, for example, described above with reference to FIG. 1A. Accordingly, in some implementations, the optical facet angle $\alpha$, 25 of an annular Fresnel element 21 may vary monotonically with respect to the distance of the facet portion 21A from the center of curvature of an annular Fresnel element 21 (or varies monotonically with respect to the radius of curvature of the annular Fresnel element 21). In some implementations, the variation of the primary optical facet angle, $\alpha$, 25, can be monotonically increasing or decreasing with respect to the radius of curvature of the annular Fresnel element 21 or distance, e.g., from the center of the optical element 20. In some implementations, the primary optical facet angle, $\alpha$, 25 can vary quadratically, parabolically, or as a polynomial function with respect to the radius of curvature of the annular Fresnel element 21 or distance, e.g., from the center of the optical element. The variation in the primary optical facet angle, $\alpha$, 25, however, is not so limited and may vary according to other profiles and need not be monotonically increasing or decreasing.

The variation in the primary optical facet angle, $\alpha$, 25, can be produced by variation in the spacing 22 of the Fresnel rings or elements 21 or variation in the height 23 of the Fresnel rings or elements 21 of both. For example, the spacing 22 of the Fresnel rings or elements 21 can change, e.g., increase or decrease, while the height 23 of the Fresnel rings or elements 21 generally remains constant. In some designs, for example, both the facet 21A and the substantially horizontal portion 21B can change with position, e.g., with distance from a location such as center of the Fresnel rings. Accordingly, the height 23 may remain substantially constant for some designs. The spacing 22 of the Fresnel rings or elements 11 may monotonically increase or decrease with respect to the center of curvature of the element 11. The variation need not be monotonic though and can both increase and decrease. For example the spacing 22 may be larger at the center and progressively get smaller at the edges. As a result, the facet angle, α, 25, may increase with radial distance from the center.

The shallower portion or substantially horizontal portion 21B may be oriented at an angle that is reduced compared to the optical facet angle α, 25. The angle at which the shallower portion is oriented may be less than ½, ⅓, ⅕, ⅒, ¹⁄₁₅, or ¹⁄₂₀ than the optical facet angle α, 25. The shallower portion 21B can be oriented at an even smaller angle. The angle at which the shallower portion 21B is oriented may be on average less than 5°, less than 3°, less than 2° less than 1° degree, less than 0.5° degree. The shallower portion 21B may be 0° degrees. The shallower portion 21B may be oriented on average at angles within any range formed by any of these values or may be outside these ranges. In some designs, the Fresnel lens or Fresnel element 20 could have a shallow portion 21B that is tilted or oriented at a larger angle than horizontal but that is less than the facet angle, α, 25. In some designs, for example, the shallower portion 21B need not be horizontal and may be inclined (or decline) by amounts larger than 5°, larger than 3°, larger than 2°, larger than 1° degree, larger than 0.5° degree, however, at a smaller angle than the optical facet angle, α, 25.

The facet height 23, also referred to as the facet depth 23, of a Fresnel surface element 21 may be the vertical distance from the top surface 6 of the substantially horizontal portion 21B (or shallower portion) of the Fresnel surface element 21 to the bottommost point of the facet portion 21A of the Fresnel surface element 21. The term bottom is being used herein for reference only and the bottommost point of the facet portion 21A may refer to the point of the facet portion 21A farthest from the topmost portion of the surface layer of material or film 24 on which the facet portion 21A is formed or with respect to the top of the optical element 20. In some implementations, the minimum, maximum, or and/or average facet depth 23 may be less than about 5 microns, less than about 4.5 microns, less than about 4 microns, less than about 3.5 microns, less than about 3 microns, less than about 2.5 microns, less than about 2.4 microns, less than about 2.3 microns, less than about 2.2 microns, less than about 2.1 microns, less than about 2 microns, less than about 1.9 microns, less than about 1.8 microns, less than about 1.7 microns, less than about 1.6 microns, less than about 1.5 microns, less than about 1.4 microns, less than about 1.3 microns, less than about 1.2 microns, less than about 1.1 microns, less than about 1 microns, less than about 0.9 microns, less than about 0.8 microns, less than about 0.7 microns, less than about 0.6 microns, or less than about 0.5 microns or smaller. In some implementations, the facet depth 23 may be from about 2.5 microns to about 0.5 microns, from about 2 microns to about 0.5 microns, from about 1.5 microns to about 0.5 microns, or from about 1 micron to about 0.5 microns. The depth may be zero, for example, in the center of the Fresnel lens or element, or elsewhere. The average facet depth may be any value in any range formed by any of these values. Other values outside these ranges may also be possible.

In some implementations, the average facet depth 23 and the average spacing 22 of the annular Fresnel elements 21 may be decoupled. For example, a Fresnel element 21 may be formed in a layer of material or film 24 such that the facet depth 23 may be selected from a desired range, as described herein, while the average spacing 22 of the Fresnel elements 21 may remain the same or in the same range (e.g., that does not cause visible dispersion) for any desired facet depth 23 or independent of the facet depth 23. In some embodiments, the average spacing 22 of the Fresnel lens elements (or grooves) 21 may be substantially the same as the average spacing 12 of a typical known Fresnel lens 10 that does not disperse incident light. In some embodiments, the minimum spacing 22 of the Fresnel lens elements 21 may be greater than about 4 microns, greater than about 5 microns, greater than about 7.5 microns, or greater than about 10 microns or greater. The average spacing 22 may be any value in any range formed by any of these values. Other values outside these ranges may also be possible. In various implementation, however, the spacing may vary across the optical element or Fresnel lens. However, the spacing 22 may be sufficiently large to reduce the amount of visible dispersion or iridescence, e.g., such that the optical element or Fresnel lens is substantially achromatic or substantially without iridescence.

Figure 2A:
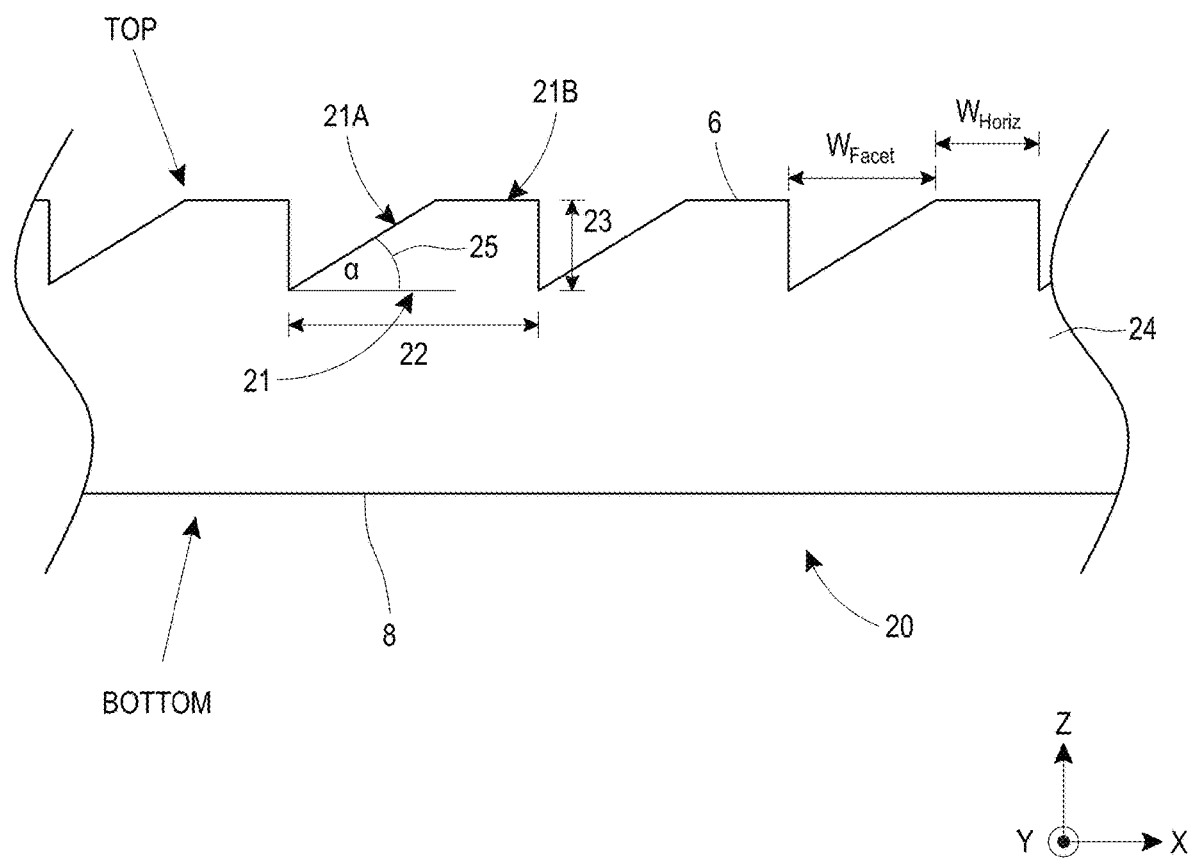
FIG. 2A is a cross-sectional view schematically illustrating of an example ultra thin optical element having Fresnel lens elements (or grooves) having planar facets.
Figure 2B:
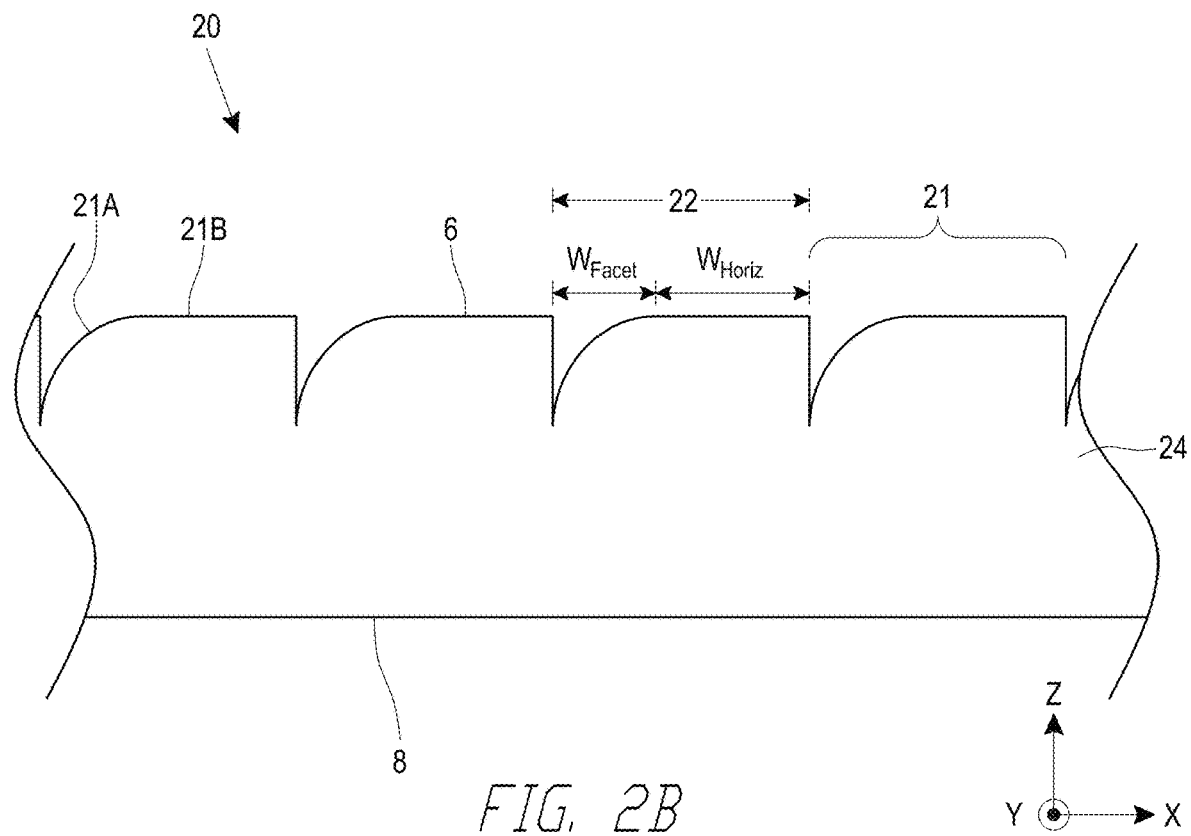
FIG. 2B is a cross-sectional view schematically illustrating of an example ultra thin optical element having Fresnel lens elements having curved facets that curve outward (convex curvature).
Figure 2C:
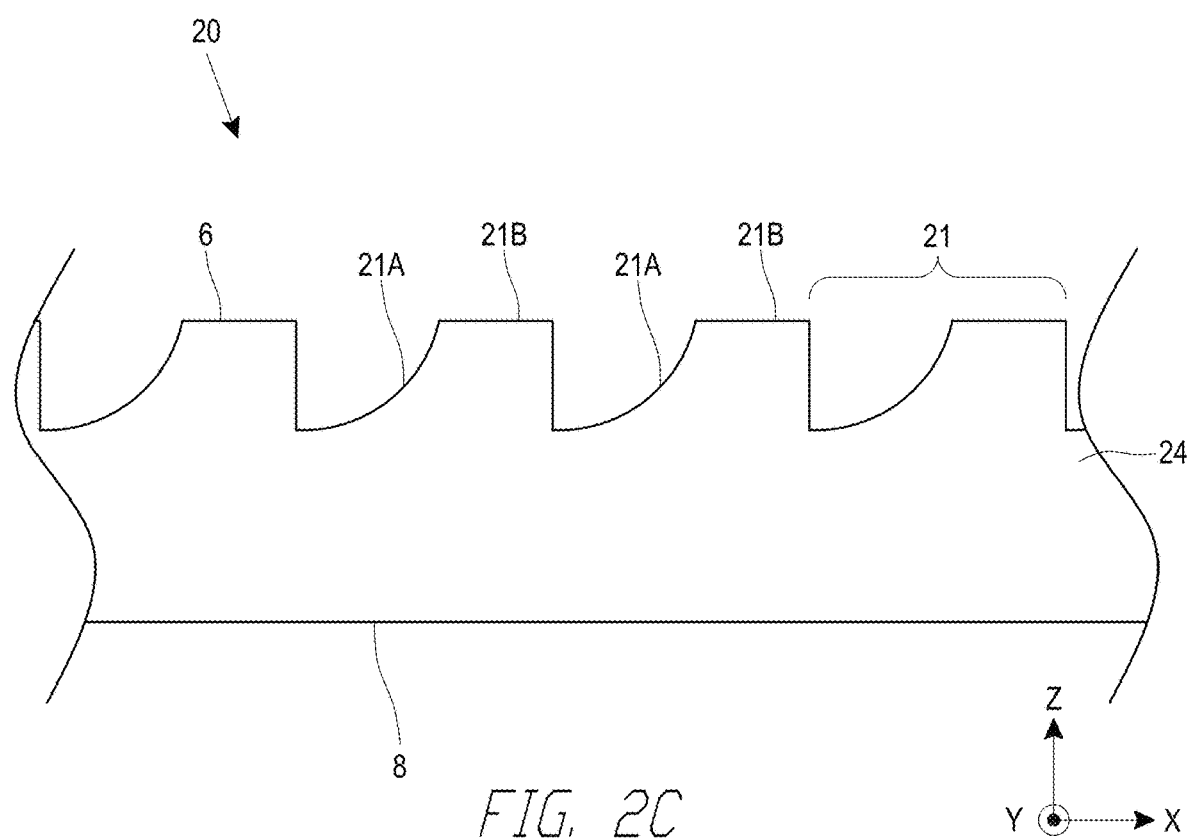
FIG. 2C is a cross-sectional view schematically illustrating of an example ultra thin optical element having Fresnel lens elements having curved facets that curve inward (concave curvature).

Although the angled facets 21A are shown as planar in FIG. 2A, the angled facets need not be planar but can be non-planar and may, for example, be curved. Examples of optical elements 20 comprising Fresnel lens elements having curved facets 21A are shown in FIGS. 2B and 2C. In FIG. 2B, the facets 21A are convex and curve or bow outward away from the layer of material 24 or from the bottom surface 8. In FIG. 2C, the facets 21A are concave and curve or bow inward toward the layer of material 24 or toward the bottom surface 8. The angled facets 21A, can however have other curvatures. Similarly, the steepness and/or shape of the angled facets 21A can be different.

As described above, the optical element 20 may comprise a plurality of Fresnel surface elements 21 formed in a layer of material or film 24. In some embodiments, the plurality of Fresnel surface elements 21 may be formed in the surface 6 of the layer of material 24 that is disposed on a substrate 26 or on a layer formed on a substrate as illustrated in FIGS. 3A and 3B.

Figure 3A:
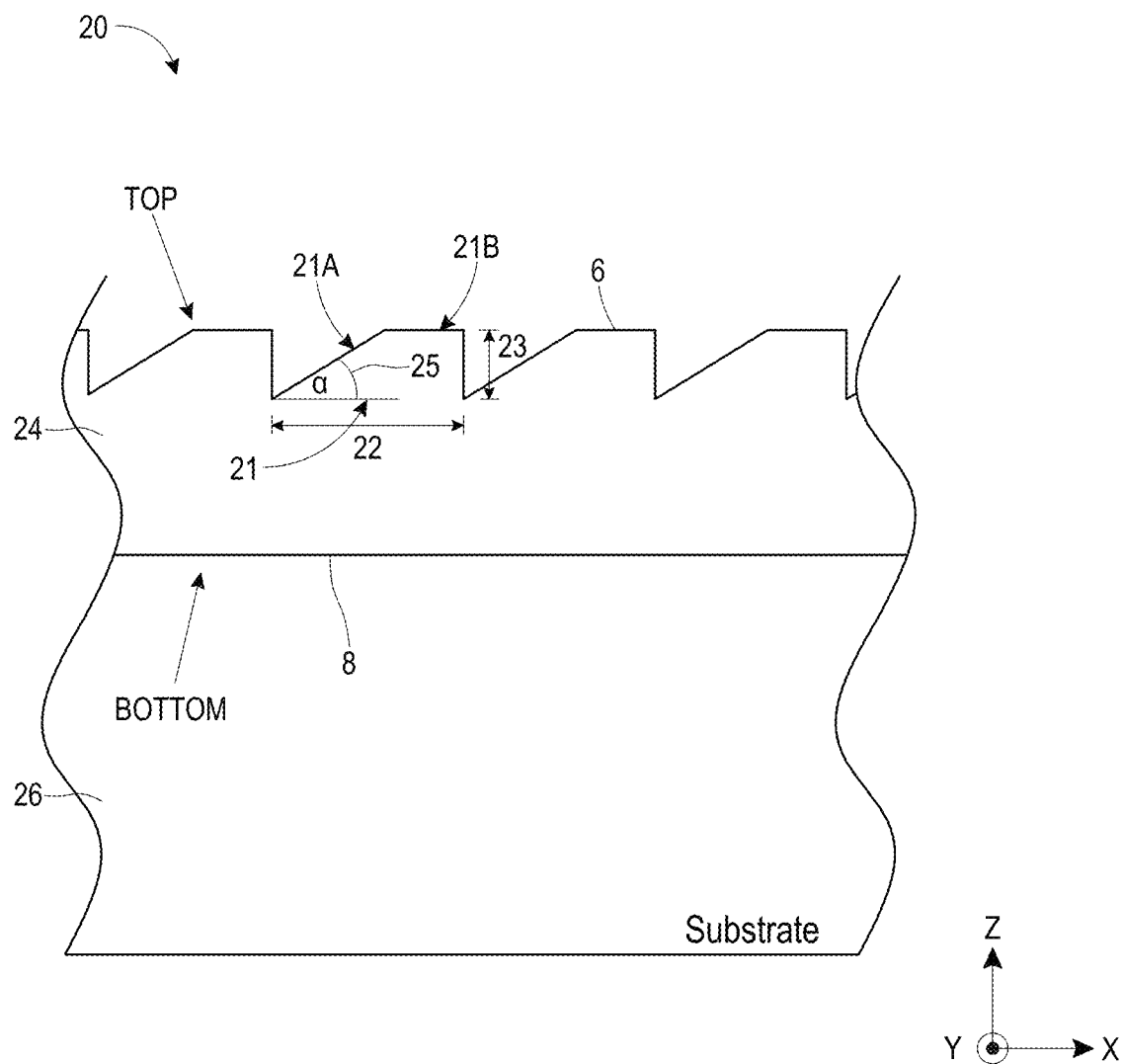
FIG. 3A is a cross-sectional view of an optical element having Fresnel lens elements comprising a plurality of indentations disposed in a layer of material or film that is disposed on a substrate such that the Fresnel lens elements are on one side of the layer of material or film and the substrate is on the other side of the layer of material of film.
Figure 3B:
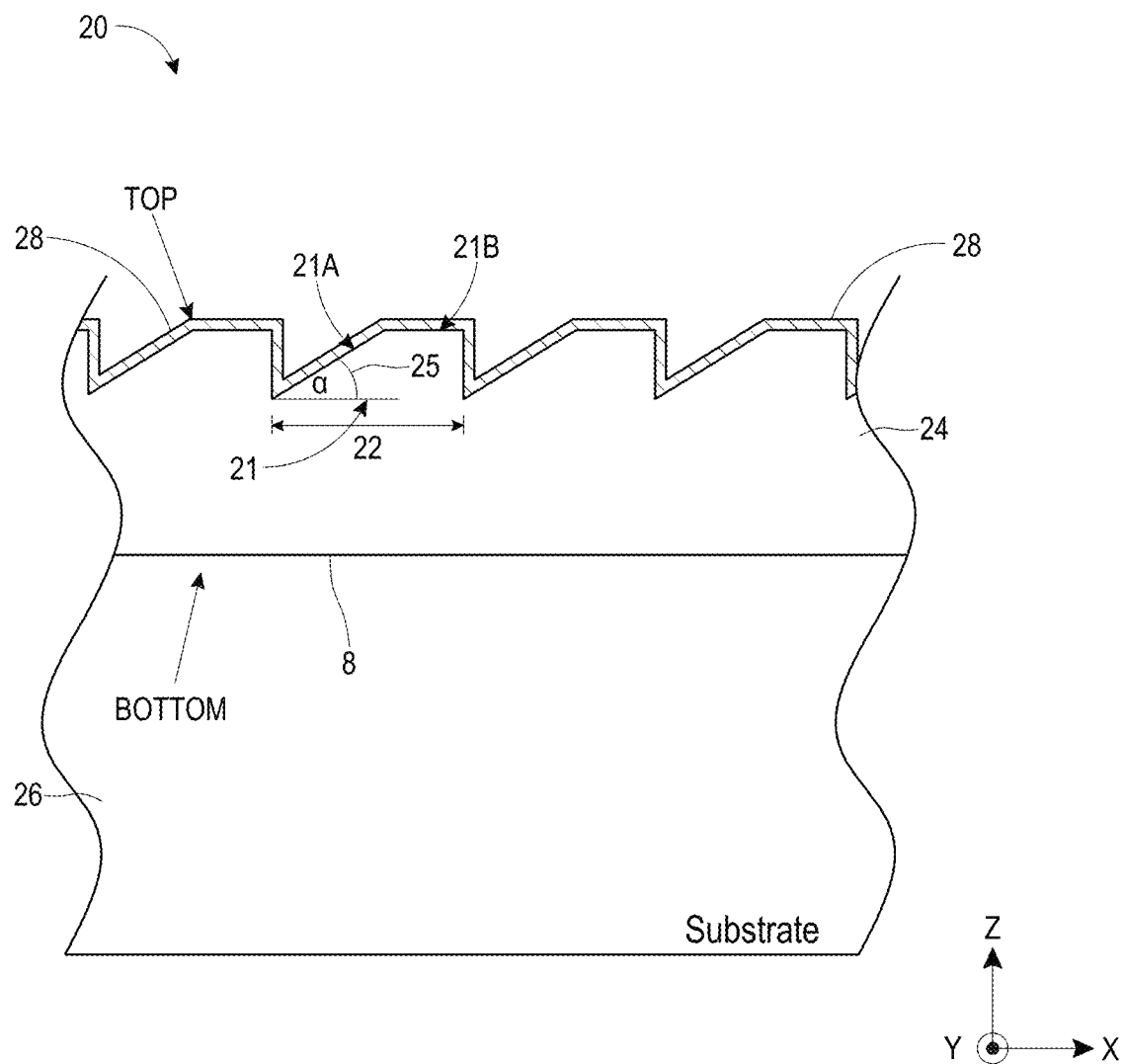
FIG. 3B is a cross-sectional view of an optical element having Fresnel lens elements similar to that shown in FIG. 3A further comprising a thin metal layer disposed on the plurality of angle facet portions and substantially horizontal portions.

FIG. 3A, for example, shows a Fresnel lens elements (or grooves) 21 disposed on the surface 6 of the layer of material 24 so as to be exposed. The layer of material or film 24 has opposite first and second (top and bottom) sides and surfaces 6, 8. In the implementation shown in FIG. 3A, the angled facet portion 21A and the horizontal portion 21B are on the first (top) side and surface 6 and the substrate 26 is on the second (bottom) side and surface 8. In some implementations, the layer of material 24 may comprise an optically transmissive or transparent layer of material and the optical element 20 may be an optically transmissive optical element 20. Likewise, in some implementations, the substrate 26 is transparent or optically transmissive. Adhesive may adhere the layer of material 24 to the substrate 26. This adhesive may comprise heat activated adhesive in some implementations. An adhesive or a cured adhesive may therefore be disposed between the layer of material 24 and the substrate 26. Also, in some cases, the plurality of Fresnel lens elements 21 may be formed by hot stamping. Other processes may also be employed.

As discussed above, the layer of material or film 24 may comprise an optically transmissive or transparent material. In some embodiments, the layer of material 24 may comprise a polymer material. For example, in some embodiments the layer of material 24 may comprise any one or combination polyester, polycarbonate, polypropylene, polyethylene terephthalate, and acrylic. Other material may also be used.

Also as discussed above, the substrate 26 may comprise an optically transmissive or transparent material. In some embodiments, the substrate 26 may comprise a polymer material. For example, in some implementations the substrate 26 may comprise any one or combination polyester, polycarbonate, polypropylene, polyethylene terephthalate, and acrylic. Other material may also be used.

In some implementations, the optical element 20 may further comprise reflective material. For example, a reflective coating 28 such as metallization may be formed on or added to the microstructure as illustrated in FIG. 3B. The facets 21A and or the horizontal portions 21B may, for example, be coated with reflective material 28 such as metal to make the optical element (e.g., Fresnel lens) reflective. Materials besides metalization such as dielectrics, including for example, zinc oxide, may be used for the reflective coating 28.

Accordingly, in some cases, the optical element 20 (e.g., Fresnel lens) may be a multilayer structure including, for example, the substrate 26 and/or one or more layers in which the facets 21A are formed and/or a reflective coating 28 such as metallization.

Although the substrate 26 may comprise optically transmissive material such as optically transparent material, the substrate need not be optically transmissive or optically transparent. The substrate 26 may comprise opaque material. The substrate 26 may, for example, comprise a paper product. The substrate 26 may, for example, comprise paper board or other material. In some cases, the substrate 26 comprises packaging or a product on which the optical element 20 is superimposed.

In some cases additional layers may be added to either or both sides of the optical element 20. In some implementations, for example, an additional layer or layers may be added to the optical element 20 once the facets 21 and/or reflective coating 28 have been formed. For example, an ink may be printed on top of an optical element 20 comprising a multilayer structure. However, in some other embodiments one or more layers may be provided below the one or more layers in which the facets 21 are formed.

Figure 3C:
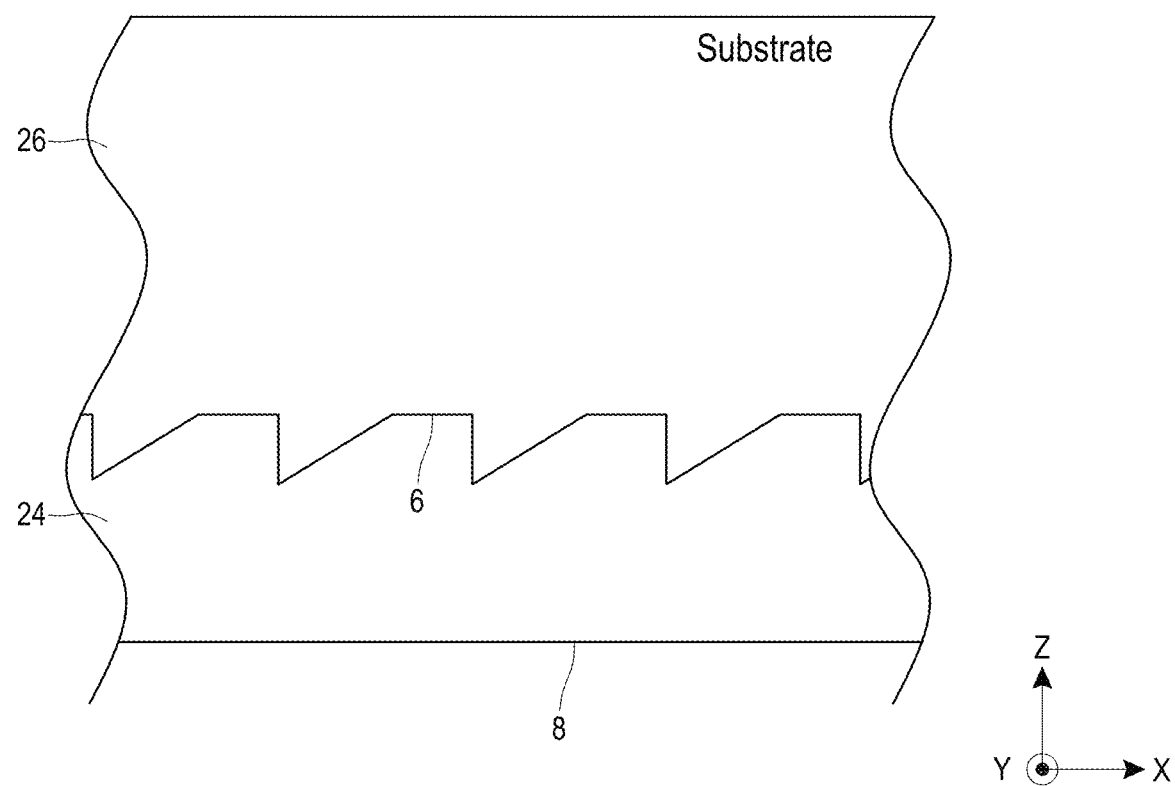
FIG. 3C is a cross-sectional view of an optical element having Fresnel lens elements comprising a plurality of indentations disposed in a layer of material or film with a substrate disposed thereon such that the Fresnel lens elements and the substrate are disposed on the same side of the layer of material or film.
Figure 3D:
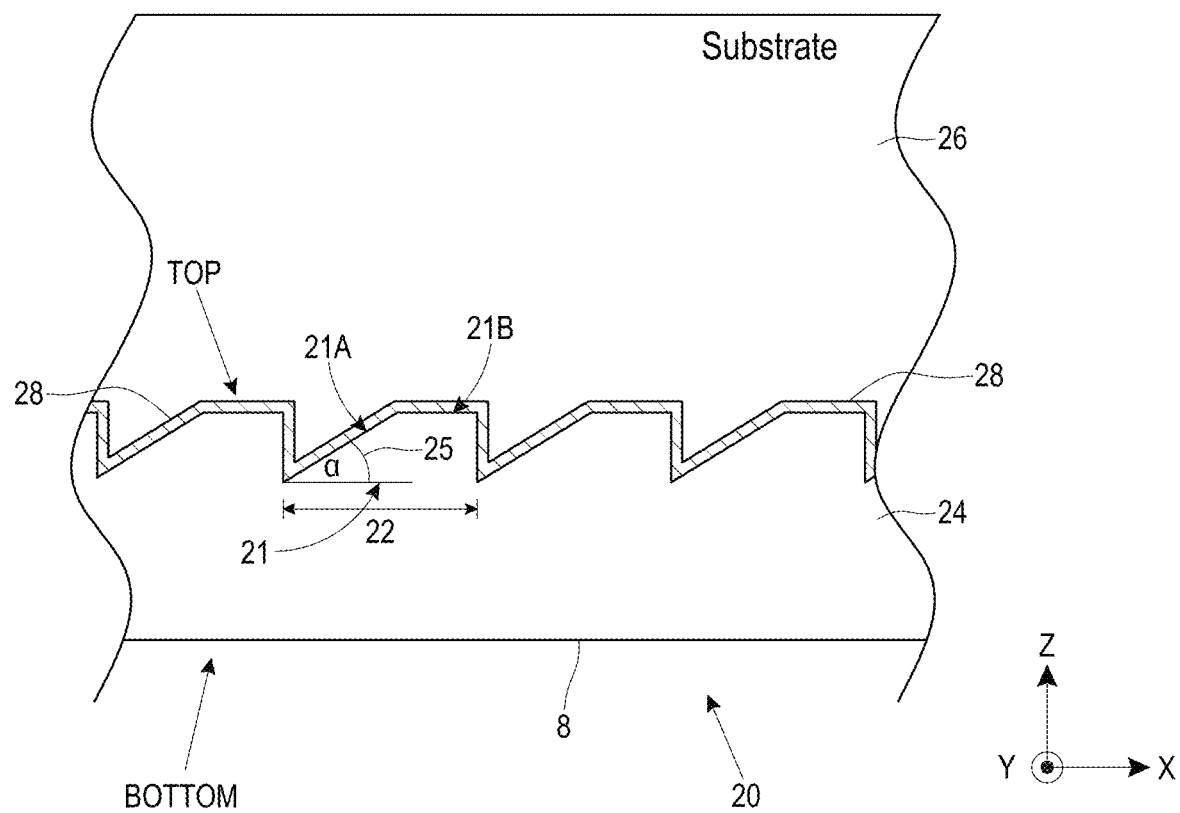
FIG. 3D is a cross-sectional view of an optical element having Fresnel lens elements similar to that shown in FIG. 3C further comprising a thin metal layer disposed between the plurality of angle facet portions and substantially horizontal portions and the substrate.

In contrast to FIGS. 3A and 3B where the Fresnel lens elements 21 and the substrate 26 are disposed on opposite sides of the layer of material 24, in FIGS. 3C and 3D the Fresnel lens elements are disposed between the substrate and the layer of material. The layer of material or film 24 has opposite first and second (top and bottom) sides (and surfaces 6, 8). In the implementation shown in FIGS. 3C and 3D, the angled facet portion 21A and the horizontal portion 21B as well as the substrate 26 are on the same side, here the first (top) side as opposed to the second (bottom) side.

In FIG. 3C, the substrate 26 is over the layer of material 24 and covers the layer of material. Similarly, the substrate 26 is over the Fresnel lens elements (or grooves) 21 and covers the Fresnel lens elements. In some implementations, adhesive adheres the substrate 26 to the layer of material 24. This adhesive may fill in the indentations in the layer of material 24 that form the angled facets as illustrated in FIG. 3C. The Fresnel lens elements 21 are thereby created by the surface or interface between the layer of material 24 with the angled facet portion 21A and the substantially horizontal portions 21B and the adhesive and/or substrate 26. As used herein, a surface need not be exposed to air but may comprise, for example, an interface between two materials or two different regions such as two regions having, e.g., different index of refraction and/or material composition. In some cases, a difference in refractive index on opposite sides of this interface or surface causes refraction of light and may provide deflection of light and/or optical power.

Accordingly, in some implementations, the layer of material 24 may comprise a transparent layer of material and the optical element 20 may be a transmissive optical element. Likewise, in some implementations, the substrate 26 is transparent or optically transmissive. As discussed above, adhesive may adhere the layer of material 24 to the substrate 26. This adhesive may comprise UV activated adhesive in some implementations. An adhesive or a cured adhesive may therefore be disposed between the layer of material 24 and the substrate 26. Also, in some cases, the plurality of Fresnel lens elements 21 may be formed by cold transfer. Other processes may also be employed.

As discussed above, the layer of material or film 24 may comprise an optically transmissive or transparent material. In some embodiments, the layer of material 24 may comprise a polymer material. For example, in some embodiments the layer of material 24 may comprise any one or combination of polyester, polycarbonate, polypropylene, polyethylene terephthalate, and acrylic. Other material may also be used.

Also as discussed above, the substrate 26 may comprise an optically transmissive or transparent material. In some embodiments, the substrate 26 may comprise a polymer material. For example, in some implementations the substrate 26 may comprise any one or combination of polyester, polycarbonate, polypropylene, polyethylene terephthalate, and acrylic. Other material may also be used.

The optical element may also comprise reflective material. For example, a reflective coating 28 such as metallization may be formed on or added to the microstructure as illustrated in FIG. 3D. The facets 21A and or the horizontal portions 21B may, for example, be coated with reflective material 28 such as metal to make the optical element reflective. Materials besides metalization such as dielectrics, including for example, zinc oxide, may be used for the reflective coating.

Accordingly, in some cases, the optical element or Fresnel lens 20 may be a multilayer structure, for example, including the substrate 26 and/or one or more layers in which the facets are formed and/or a reflective coating such as metallization.

Although the substrate 26 may comprise optically transmissive material such as optically transparent material, the substrate 26 need not be optically transmissive or optically transparent. The substrate 26 may comprise opaque material. The substrate 26 may for example comprise a paper product. The substrate 26 may, for example, comprise paper board or other material. In some cases, the substrate 26 comprises packaging or a product on which the optical element 20 is superimposed.

Figure 4A:
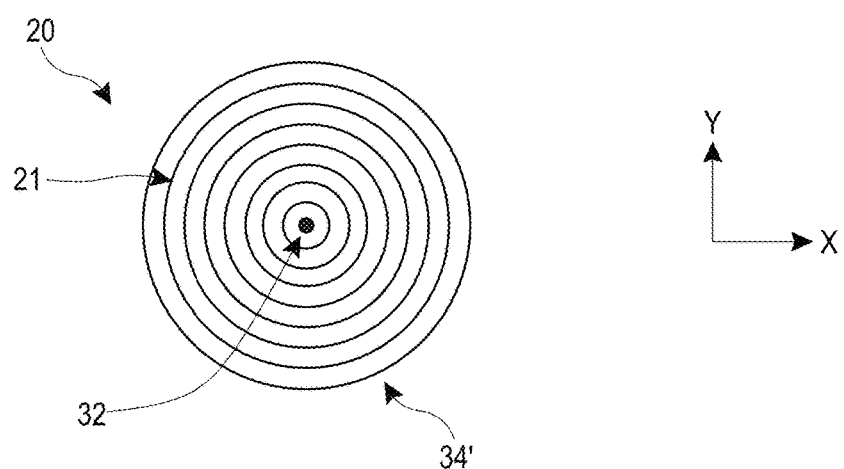
FIG. 4A is a top view of an optical element comprising annular Fresnel lens elements that are arranged in a concentric pattern.

As discussed above, the optical element 20 may comprise a plurality of annular Fresnel lens elements 21 as illustrated in FIG. 4A. Accordingly, the facets 21A that are part of the Fresnel lens elements 21 may be annular. Similarly, the substantially horizontal portions 21B that are part of the Fresnel lens elements 21 may be annular. The optical element 20 may, in some implementations, have optical power. As discussed above, the optical element may 20 comprise a Fresnel lens.

Figure 4B:
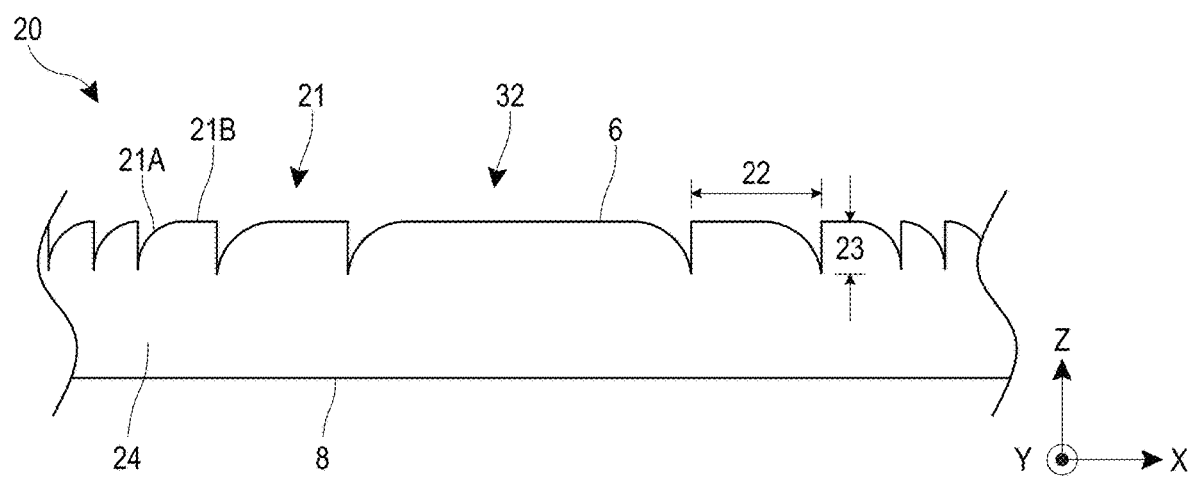
FIG. 4B is a cross-sectional view of an optical element showing the spacing between Fresnel lens elements as reducing in size with distance from the center.

FIG. 4B schematically illustrates an example cross-section of a portion of the optical element 20. As shown, a primary angle, $\alpha$, of the angled facet portion 21A of the Fresnel lens elements 21 on average increases from a portion of the optical element 20 to another portion of the optical element. For example, the angle, $\alpha$, of the angled facet portion 21A of the Fresnel lens elements 21 may on average increase from a central portion 32 of the optical element 20 to a peripheral portion 34 of the optical element. In some implementations, for example, the spacing 22 of the plurality of Fresnel elements 21 on average decreases from a portion of the optical element 20 to another portion of the optical element. In some such cases, the facet height or depth 23 may be constant, and the angle, α, may still increase because the spacing 22 reduces. The average increase in angle, α, or decrease in spacing 22 may occur over 5 to 10 consecutive Fresnel lens elements 21, 10 to 15 consecutive Fresnel lens elements, 15 to 20 consecutive Fresnel surface elements or any range between any of these values, or outside these ranges. In some implementations, the spacing 22 of the plurality of the Fresnel elements 21 on average decreases from a central portion 32 of the optical element 20 to a peripheral portion 34 of the optical element.

Likewise, the angle, α, of the angled facet portion 21A of the Fresnel surface elements 21 can on average decrease from a portion of the optical element 20 to another portion of the optical element. The spacing 22 of the plurality of Fresnel elements 21 can on average increase from a portion of the optical element to another portion of the optical element (while the facet depth remains substantially constant). The average decrease in angle or increase in spacing 22 may occurs over 5 to 10 consecutive Fresnel lens elements 21, 10 to 15 consecutive Fresnel lens elements, 15 to 20 consecutive Fresnel lens elements or any range between any of these values, or outside these ranges.

In various implementations, the angle, α, of the angled facet portion 21A of Fresnel lens elements 21 can vary with respect to the center of curvature of the Fresnel lens element.

Although optical elements 20 can have a monotonically varying characteristic, such as facet angle, α, such characteristics need not vary monotonically. For the facet angle, α, can increase and then decrease or decrease and then increase or both or increase and decrease (or decrease and increase) multiple times with distance from a location on the optical element. Such an optical element 20 may be described as having an undulating pattern. The facet angle, α, may increase and/or decrease with distance from the left or with distance from the right or with distance from the top or with distance from the bottom, for example. The facet angle, α, may be zero or close to zero on some portions of the optical element 20 creating for example one or more flat regions. The flat region may be at the center of the optical element 20 in some cases, however, the flat region need not be limited to the center of the optical element 20. Multiple flat regions may also exist wherein the facet angle, α, is zero or substantially zero.

Figure 8:
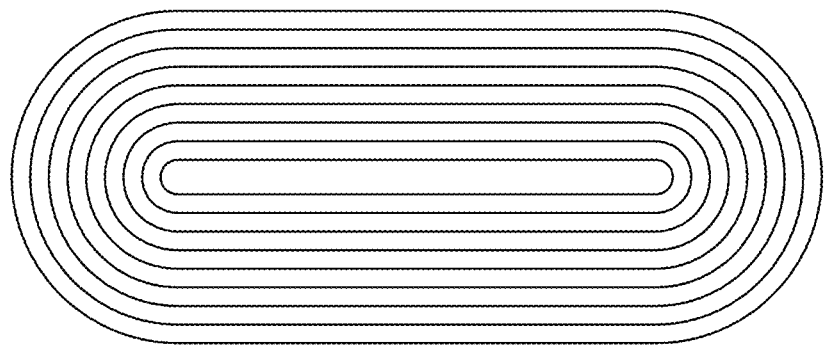
FIG. 8 is a top view of an optical element comprising cylindrical Fresnel lens elements.

Also, although the Fresnel lens elements 21 are shown as annular in FIG. 54, the Fresnel lens elements need not be annular. Similarly, although the Fresnel lens elements 21 are shown as circular in FIG. 54, the Fresnel lens elements need not be circular. A variety of shapes, configurations, and arrangements are possible. FIG. 8 shows an example of a cylindrical Fresnel lens comprising a plurality of elements 21. Such cylindrical Fresnel lens elements 21 may provide different optical power in one direction than another of the optical element 20. The cylindrical Fresnel lens elements 21 may, for example, provide a first optical power in a first direction and a second optical power in a second direction, wherein the first optical power is greater than the second optical power. These directions may, in some cases, be orthogonal directions, such as for example directions parallel to the horizontal and vertical or parallel to x and y axes. Other arrangements are possible though. As discussed herein, the optical element 20 may include Fresnel lens elements 21 comprising facets 21A and horizontal portions 21B.

Figure 9:
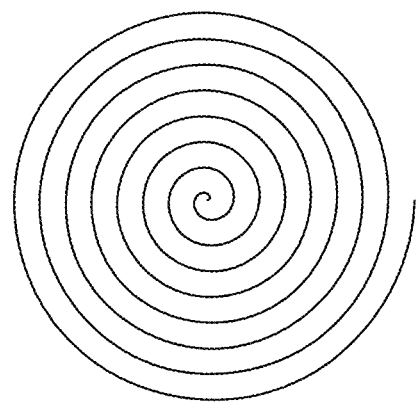
FIG. 9 is a top view of an optical element comprising a spiral shaped Fresnel lens element.
Figure 10A:
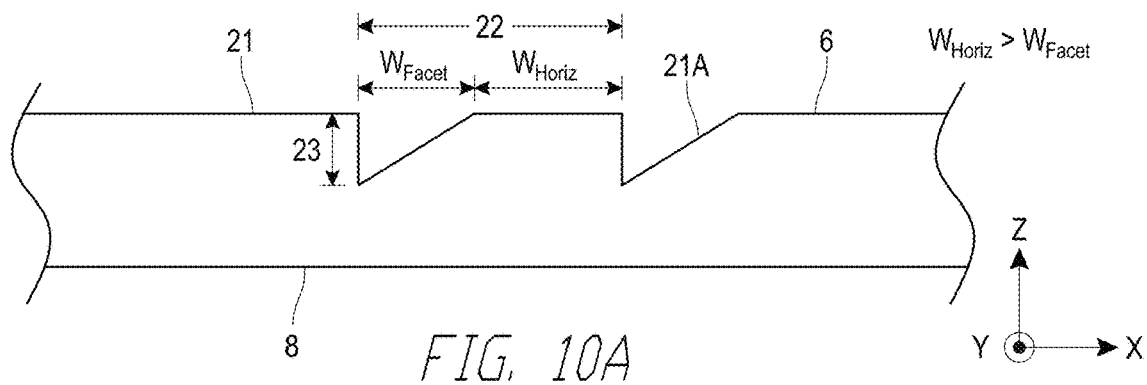
FIG. 10A-10D are cross-sectional views showing the Fresnel lens elements comprising a plurality of angled facet portions and substantially horizontal portions wherein the width of the substantially horizontal portions is greater than the width (e.g., projected width) of the angled facet portions.
Figure 10B:
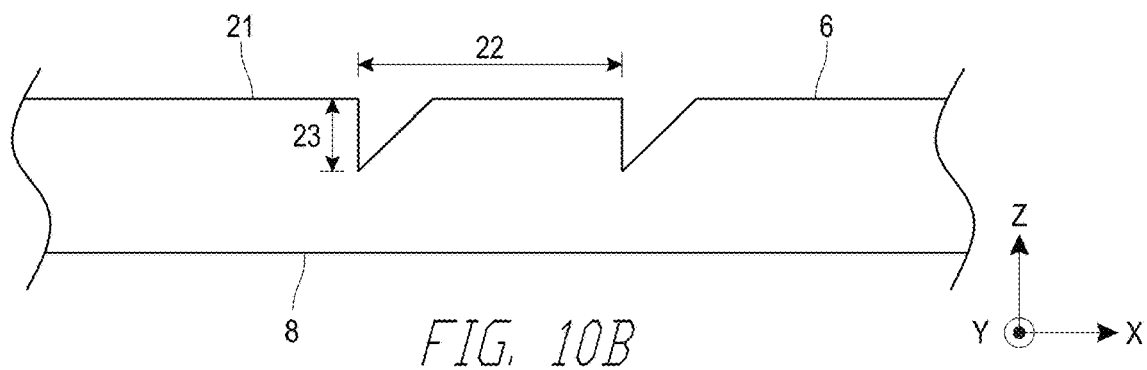
Figure 10C:
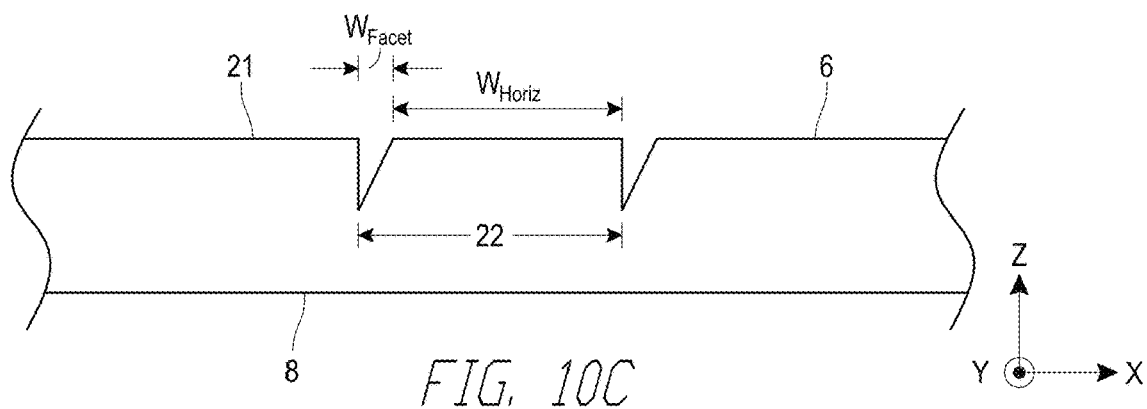
Figure 10D:
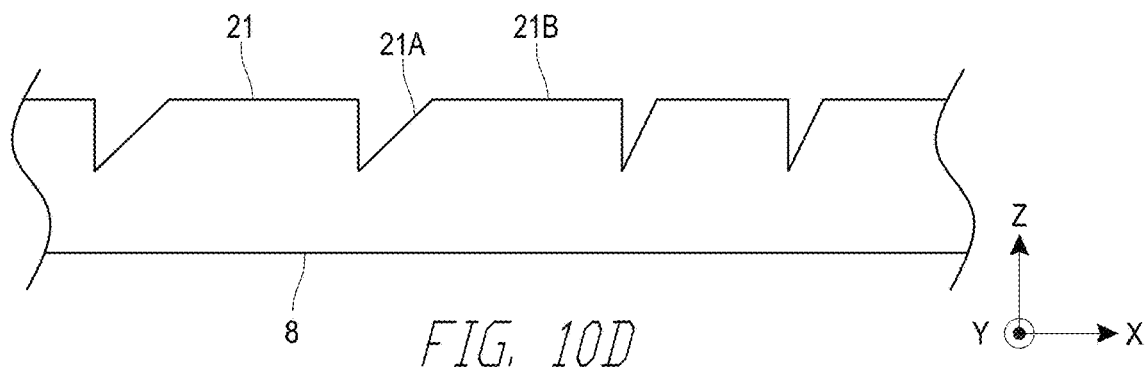

As shown in FIG. 9 and in some embodiments an optical element 20 may comprise, for example, one or more Fresnel lens elements 21 comprising a spiral cut. In some implementations, the distance of the angled facet portion 21A (and horizontal portions 21B) from the center or central portion increases with rotation about the center or central portion. Spiral cuts can be employed for other shapes, such as for example, cylindrical lenses.

The optical element 20 may produce different optical effects depending on the type of optical element. An optical element comprising a plurality of Fresnel lens elements comprising concentric rings, for example, may produce an image of a ball when viewed, for example, when the optical element is reflective (such as is metalized so as to be reflective). The reflections are distorted in a manner that resembles the reflections from a metal ball or orb. An optical element comprising a cylindrical Fresnel lens, may produce an elongate image having a bar-shape, rod-shape, or pillar shape when viewed, for example, when the optical element is reflective. The reflections are distorted in a manner that resembles the reflections from a metal bar, rod or pillar.

As discussed above, in some implementations, the optical element may comprise a plurality of annular Fresnel surface elements 21, where the Fresnel surface elements 21 vary in optical power from positive to negative (and possibly back to positive) from a more central location to a more peripheral location of the Fresnel lens (e.g., with respect to the center of the Fresnel lens). Alternatively, the facet angles of the Fresnel surface elements 21 could vary from negative to positive (and possibly back to negative) optical power from a more central location to a more peripheral location of the Fresnel lens (e.g., with respect to the center of the Fresnel lens). Such an optical element may be referred to as undulating. In some designs, the angle of the angled facet portion may vary so as to provide the variations from positive and negative optical power and/or vice versa. Such an optical element comprising an undulating pattern may comprise an annular or ring-like pattern such as possibly a plurality of concentric rings. The undulating pattern, in some cases, may produce an image of a toroid or doughnut shaped structure, for example, when the optical element is reflective (such as is metalized so as to be reflective). An optical element comprising a plurality of undulating Fresnel surface elements 21 such as an annular or ring-like pattern comprising a plurality of concentric rings that oscillates between positive and negative optical power a number of times, e.g., more than more than three times, may possibly produce an image of a plurality of concentric toriods. The result may in some cases be an image that appears to be an undulating or wavelike surface that may, for example, look like the waves produced when a rock is dropped into a still pond.

In some cases, the ultra thin Fresnel lens may not disperse incident light even though a facet depth 23 of the ultra thin Fresnel lens may be smaller than a facet depth 12 at which an typical known Fresnel lens 10 would disperse incident light. Likewise, with certain designs, an optical element 20 having one or more or characteristics or features as described herein may have a desired achromatic or substantially achromatic or metallic appearance with a facet depth 23 less than about 2.5 microns as described above. In some implementations, the facet depth or height 23 is less than 5 microns, 4 microns, 3 microns, 2.5 microns, 2.0 microns, 1 micron or less or may be greater than 0.5 microns, 1 micron, 1.5 micron, 2.0 micron, 3.0 micron, or may be any value in any range defined by any of these values or may be outside such ranges. Being achromatic or substantially achromatic appearance, the optical element 20 may reflect or transmit incident light (depending on whether the optical element is a reflective or transmissive optical element) without a substantial amount of color dispersion or iridescence.

A transmissive optical element may for example transmit more light than it reflects while a reflective optical element may reflect more light than it transmits. In some implementations, the optical element 20 is a transmissive optical element (transmitting more light than it reflects) while other of the optical element is s reflective optical elements (reflecting more light than it transmits).

Accordingly, in various implementations, an optical element 20 may comprise a plurality of Fresnel lens elements 21 comprising an angled facet portion 21A and a shallower portion (e.g., a substantially horizontal portion) 21B, where the minimum spacing 22 of the Fresnel lens elements 21 corresponds to the spacing or frequency of the grooves in a conventional thicker Fresnel elements 11 that does not cause dispersion, but the facet depth or height 23 of the ultrathin Fresnel surface elements is less than the facet depth or height of the conventional thicker Fresnel elements. In this way, various implementations of the optical element 20, for example, an ultrathin Fresnel lens 20 having one or more characteristics as described above, may be formed having a minimum spacing 22 or frequency that is substantially similar to the frequency of a conventional Fresnel lens that does not cause prominent dispersion, while the formed optical element 20 has a facet depth or height 23 that is smaller than the facet depth or height of the conventional Fresnel lens.

EXAMPLES

Figure 5:
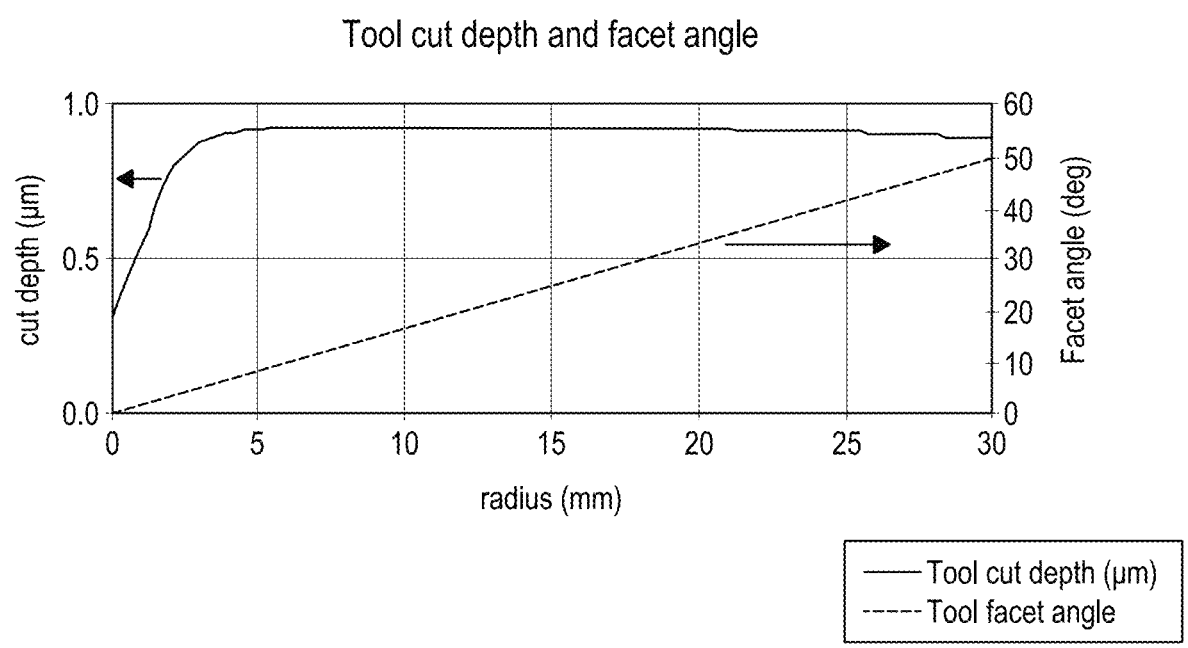
FIG. 5 shows plots of facet cut depth and facet angle of the tool for forming an ultra thin Fresnel lens as functions of radius.

FIG. 5 shows the facet depth or height 23 of a tool used to fabricate the ultra thin optical element (e.g., Fresnel lens) as well as the facet angle, α, plotted as a function of radial distance.

As can be seen in FIG. 5, the facet depth 23 of the ultra thin Fresnel lens is less than about 1.0 microns. The facet angle, α, also changes with radial position on the optical element (e.g. Fresnel lens) 20. Note that above a certain radius, e.g., 5 mm, the facet depth 23 is substantially constant. The facet spacing 22 may be changing (e.g., reducing) to provide the facet angle, α, that increases above 5 mm and toward the periphery 34.

Figure 6A:
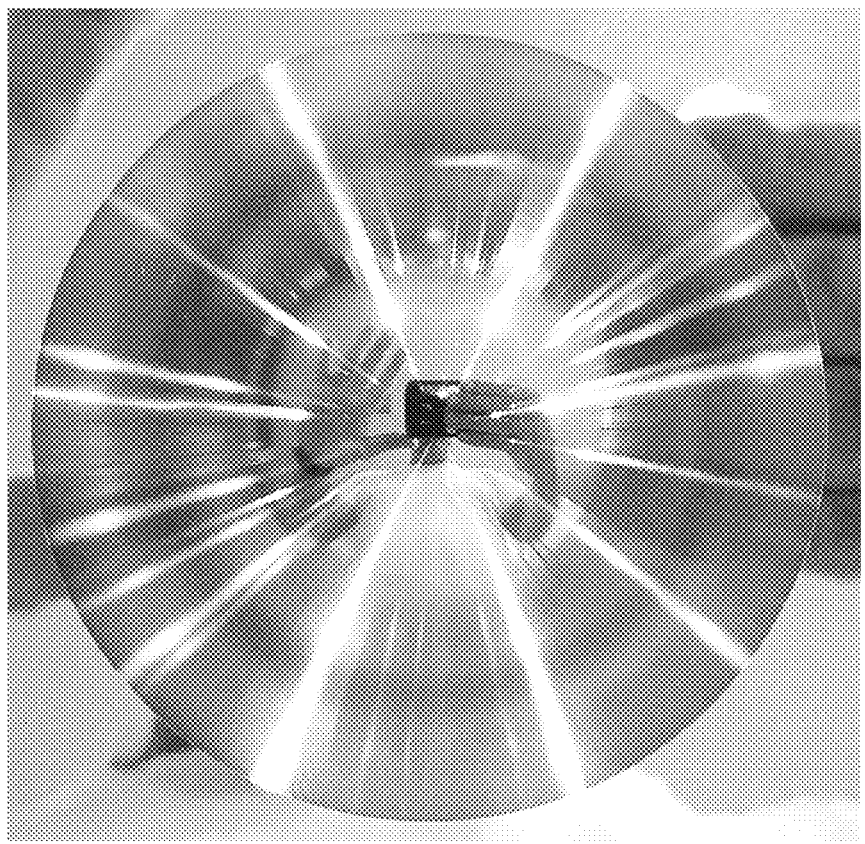
FIG. 6A is an image of a thick Fresnel lens that has a minimum facet spacing of 4 microns or larger and thus is achromatic or "metallic" in appearance with substantially reduced color dispersion (for example, as compared to the thin Fresnel lens shown in FIG. 6B below). The photographer who took the photograph is visible at the center of the lens. The reflection of the photographer shows the photographer's right hand (on left side) as well as the camera held in the photographer's left hand (on right side).
Figure 6B:
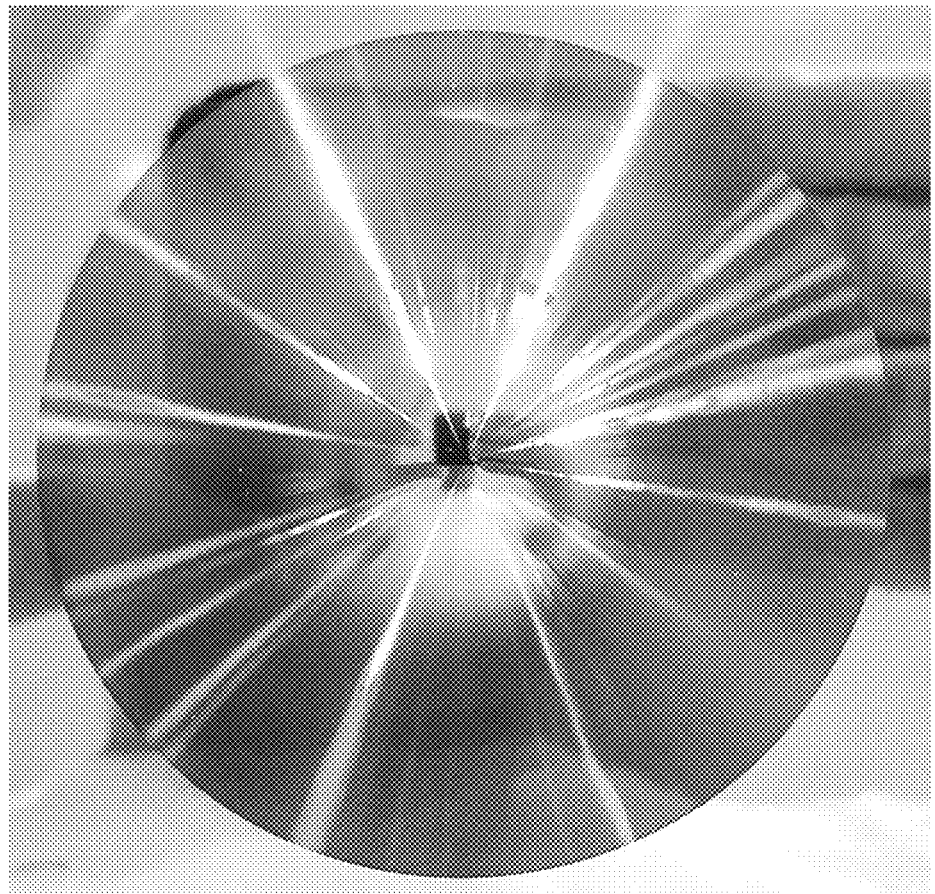
FIG. 6B is an image of a thin Fresnel lens that has both reduced thickness and reduced facet spacing. Once again, the photographer who took the photograph is visible at the center of the lens. The reflection of the photographer shows the photographer's right hand (on left side) as well as the camera held in the photographer's left hand (on right side). The reduced facet spacing of this thin Fresnel lens causes coloring (e.g., a rainbow) that is characteristic of undesirable color dispersion of incident light resulting from the lower pitch or facet spacing (e.g., minimum spacing less than 4 microns) or higher frequency of Fresnel facets. Scaling down the size of the Fresnel features to produce a thinner structure can result in reducing the spacing between Fresnel facets increasing the frequency of the Fresnel facets and increasing the visible dispersion. The dispersion introduces chromatic aberration that causes the image reflected from the lens to be blurred in comparison, for example, to the image reflected from the thick Fresnel lens shown in FIG. 6A, which has less dispersion because the minimum spacing is larger. Compare images of photographer at the center of the lenses shown in FIGS. 6A and 6B.
Figure 7:
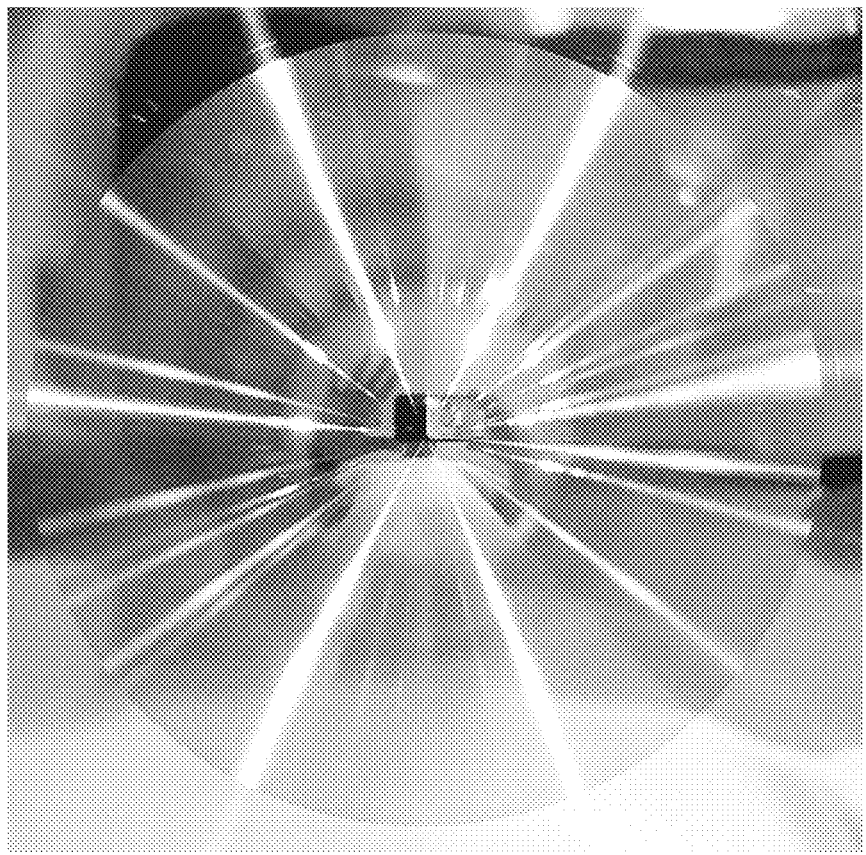
FIG. 7 is an image of an "ultra" thin Fresnel lens that has a higher pitch or facet spacing (e.g., minimum facet spacing of 4 microns or larger) or lower frequency of Fresnel facets in comparison to the lower pitch or facet spacing or higher frequency of Fresnel facets of FIG. 6B. Once again, the photographer who took the photograph is visible at the center of the lens. The reflection of the photographer shows the photographer's right hand (on left side) as well as the camera held in the photographer's left hand (on right side). Although the the thickness of the facets in the lens shown in FIG. 7 are reduced, the spacing of the facets is not reduced so as to cause the minimum facet spacing to be less than 4 microns. As a result of the larger facet spacing, the Fresnel lens is achromatic or "metallic" in appearance and has substantially reduced color dispersion. The reduced dispersion produces less chromatic aberration that would otherwise cause the image produced by the lens of FIG. 7 to be more blurred. See, e.g., the relatively blurred image of the photograph at center of FIG. 6B. The image of the photograph at the center of the "ultra" thin Fresnel lens shown in FIG. 7 is sharper than the image of the photographer at the center of the Fresnel lens shown in FIG. 6B, because the minimum facet spacing of the "ultra" thin lens of FIG. 7 is larger and produces less chromatic aberration.

FIG. 6A is an image of a thick Fresnel lens that has a minimum facet spacing of 4 microns or larger. Having a minimum facet spacing of 4 microns or larger reduces dispersion and produces a more achromatic or "metallic" in appearance. Depending on the application, in some cases, however, being thick can be less preferred. As discussed above, the photographer who took the photograph of the Fresnel lens of FIG. 6A as well as the photographer who took the photograph of the Fresnel lenses of FIGS. 6B and 7 is visible at the center of the respective lenses. The reflections of the photographer in the respective lenses shows the photographer's right hand (on left side) as well as the camera held in the photographer's left hand (on right side). A mirror image of the photographer is visible, therefore the photographer's right hand is on the left side and the photographer's left hand is on the right side of the image.

FIG. 6B shows an example of a thinner optical element (e.g., Fresnel lens) than the optical element shown in FIG. 6A. The optical element shown in FIG. 6B has been made thinner by scaling down both facet height 23 and spacing 22.

The Fresnel lens 20 has a facet depth 23 less than about 2.5 microns and a corresponding facet spacing of less than about 4.2 microns. As a result of the reduced facet spacing 22, however, there is significant color dispersion of incident white light resulting in rainbow colored sections and different sections with different highly saturated colors. Moreover, the color dispersion results in chromatic aberration that causes the image of the photographer at the center of the Fresnel lens to be blurred in comparison, for example, to the image of the photographer at the center of the thick Fresnel lens shown in FIG. 6A, which has less dispersion because the minimum spacing is larger. The blur, for example, of the hands of the photographer (especially the right hand on the left side) as well as of the camera are clearly visible in FIG. 6B.

The resultant optical properties of an optical element (e.g. Fresnel lens) 20 designed as described herein can be observed in the example reflective optical element shown in FIG. 7. The Fresnel lens shown in FIG. 7 has a reduced facet depth, for example, a maximum facet depth of about 0.8 microns such as shown in the plot of FIG. 5. Despite the very small facet depth 23, which can be included in a reduced thickness optical element (e.g., "ultra thin" optical element), the minimum facet spacing is 4 micrometers or larger. As a result of the larger facet spacing, the Fresnel lens is achromatic or "metallic" in appearance and has substantially reduced color dispersion. Moreover, as described above, the reduced dispersion produces less chromatic aberration that would otherwise cause the image of the photographer at the center of the photo to be more blurred. (See, for comparison, the clearer image of the hand of the photographer (e.g., right hand) that is visible in FIG. 7 as compared to the relatively blurred image of the photographer's hand at the center of the Fresnel lens shown in FIG. 6B). The image of the photographer at the center of the "ultra" thin Fresnel lens shown in FIG. 7 is sharper than the image of the photographer at the center of the Fresnel lens shown in FIG. 6B, because the minimum facet spacing of the "ultra" thin lens of FIG. 7 is larger and thus the lens produces less chromatic aberration.

Although Fresnel lens 20 having circular and/or annular Fresnel lens elements 21 are possible, for example, as shown in in FIG. 4A, the Fresnel lens elements may be different and have different shapes. For example, the Fresnel lens elements 21 need not be circular or annular. The Fresnel lens elements 21 may, for example, be cylindrical and have linear Fresnel lens element portions, such as shown in FIG. 8. Other variations are possible, for example, an optical element can have Fresnel surface elements that have an undulating pattern. Similarly, as described above, the Fresnel lens elements may comprise a spiral cut. As shown, this spiral shape includes a center and a plurality of annular or ring shaped elements that are concentric. FIGS. 8 and 9 schematically show top views of optical elements 20 comprising a plurality of Fresnel lens elements 21. The shape and number of the Fresnel lens elements 21 may vary from that shown. Likewise, the shape and size of the optical element 20 can vary from that shown.

Similarly, a plurality of optical elements 20 may be included together, for example, in a sheet. The boundaries between the optical elements 20 may be regular (such as a square or rectangular array) or irregular (e.g., random or pseudorandom or otherwise irregular). The optical elements 20 may be arrange to produce a letter, character, symbol, image, etc. or may be selectively disposed on portions of a surface so as to coincide with letter, character, symbol or image. The optical elements 20 may, for example, be disposed on a portion of packaging where lettering or an image is disposed. In this manner, the optical effect produced by the optical elements 20 may highlight the letters or image (or other character or symbols). As discussed above, in some embodiments the optical element 20 may produce the image of a ball or orb, wherein the focal length of the Fresnel lens comprising the optical element 20 is correlated to the diameter of the ball or orb.

As illustrated in FIGS. 11A-11D, certain optical element 20 may comprise Fresnel lens elements 21 comprising angled facet portions 21A and substantially horizontal portions 21B wherein the width of the substantially horizontal portion is greater than the width of the angled facet portions. Such a configuration may attenuate the optical effect caused by the angled facet portions 21A, which may be desirable in some applications. Likewise in certain implementations, the width of the substantially horizontal portion 21B comprises 50% or more of the width 22 of the Fresnel lens element 21 and the width of the faceted portion 21A may comprise 50% or less of the width of the Fresnel lens element. Similarly, in some implementations, the width of the substantially horizontal portion 21B comprises 60% or more of the width 22 of the Fresnel lens element 21 and the width of the faceted portion 21A may comprise 40% or less of the width of the Fresnel lens element 21. In some implementations, the width of the substantially horizontal portion 21B comprise 70% or more of the width 22 of the Fresnel lens element 21 and the width of the faceted portion 21A may comprise 30% or less of the width of the Fresnel optical element. In some implementations, the width of the substantially horizontal portion 21B comprise 80% or more of the width 22 of the Fresnel lens element 21 and the width of the faceted portion 21A may comprise 20% or less of the width of the Fresnel lens element. Accordingly, the width of the substantially horizontal portion 21B may comprise 50%, 60%, 70%, 80% or more of the width or spacing 22 between Fresnel lens elements 21 and may be less than 95%, 85%, 75%, 65% for one or more of the Fresnel lens elements in the optical element 20. Any value in any range formed by any of these values are possible, although values outside these ranges are also possible. Similarly, the width of the angled facet portion 21A may comprise 50%, 40%, 30%, 20% or less of the width or spacing 22 between Fresnel lens elements 21 and may be more than 45%, 35%, 25%, 15% for one or more of the Fresnel lens elements in the optical element 20. Any value in any range formed by any of these values are possible, although values outside these ranges are also possible.

In such implementations, the facet depth 23 may or may not be less than 2.5 microns. In some implementations, the facet depth or height 23 is larger than 2.5 microns, 3 microns, 4 microns, 5 microns, 10 microns, 20 microns although smaller facet depths are possible and may be smaller than 50 microns, 40 microns, 25 microns, 15 microns, 10 microns, 5 microns. Although the facet depth may be any value in any range defined by any of these values, other facet depths outside these ranges are also possible.

In some implementations, the facet depth or height 23 is less than 2.0 microns, 1.0 microns, 0.5 microns. In some embodiments, the facet or height 23 is greater than 0.5 microns, 1.0 microns, or 1.5 microns. Although the facet depth may be any value in any range defined by any of these values, other facet depths outside these ranges are also possible.

As discussed above, features in the drawings provided herein may not be to scale.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical element, said optical element having first and second surfaces separated from each other in a vertical direction, said optical element comprising:
   a plurality of Fresnel lens elements spaced in a horizontal direction with respect to each other, individual ones of said plurality of Fresnel lens elements comprising an angled facet portion and a substantially horizontal portion, said plurality of Fresnel lens elements closer in said vertical direction to said first surface than said second surface,
   wherein said angled facet portion has a depth that is on average less than about 5 microns.

2. The optical element of claim 1, wherein the depth is on average less than about 2.5 microns.

3. The optical element of claim 1, wherein the depth is on average less than about 1 micron.

4. The optical element of claim 1, wherein the vertical distance from (i) points of the angled facet portion closest to said second surface to (ii) the part of the closest substantially horizontal portion farthest from the second surface is on average less than 5 microns.

5. The optical element of claim 1, wherein the vertical distance from (i) points of the angled facet portion closest to said second surface to (ii) the part of the closest substantially horizontal portion farthest from the second surface is on average less than 2.5 microns.

6. The optical element of claim 1, wherein the vertical distance from (i) points of the angled facet portion closest to said second surface to (ii) the part of the closest substantially horizontal portion farthest from the second surface is on average less than 1 micron.

7. The optical element of claim 1, wherein a minimum spacing of the plurality of Fresnel lens elements is greater than or equal to 4 microns.

8. The optical element of claim 1, wherein the spacing of the plurality of Fresnel lens elements on average decreases from a portion of the optical element to another portion of the optical element.

9. The optical element of claim 1, wherein the spacing of the plurality of the Fresnel lens elements on average decreases from a central portion of the optical element to a peripheral portion of the optical element.

10. The optical element of claim 1, wherein an angle of the angled facet portion of the Fresnel lens elements on average increases from a portion of the optical element to another portion of the optical element.

11. The optical element of claim 1, wherein an angle of the angled facet portion of the Fresnel lens elements on average decreases from a portion of the optical element to another portion of the optical element.

12. The optical element of claim 1, wherein an angle of the angled facet portion of the Fresnel lens elements on average increases from a central portion of the optical element to a peripheral portion of the optical element.

13. The optical element of claim 1, wherein the depth is on average from about 0.5 micron to less than about 5 microns.

14. The optical element of claim 1, wherein the spacing of the plurality of Fresnel lens elements on average increases from a portion of the optical element to another portion of the optical element.

15. The optical element of claim 14, wherein the average increase occurs over 5 to 10 consecutive Fresnel lens elements.

16. The optical element of claim 14, wherein the average increase occurs over 10 to 15 consecutive Fresnel lens elements.

17. The optical element of claim 14, wherein the average increase occurs over 15 to 20 consecutive Fresnel lens elements.

18. An optical element, said optical element having first and second surfaces separated from each other in a vertical direction, said optical element comprising:
   a plurality of Fresnel lens element portions spaced in a horizontal direction with respect to each other, said plurality of Fresnel lens element portions comprising an angled facet section and a substantially horizontal section, said plurality of Fresnel lens element portions closer in said vertical direction to said first surface than said second surface,
   wherein a vertical distance from (i) points of the angled facet section closest to said second surface to (ii) the part of the closest substantially horizontal section farthest from the second surface is on average less than about 5 microns.

19. The optical element of claim 18, wherein the vertical distance is on average from about 0.5 micron to less than about 5 microns.

20. An optical element having top and bottom surfaces extending across a length, said optical element comprising:
   a plurality of Fresnel lens elements comprising an angled facet portion having an angle α with respect to said length of said optical element and a shallow portion having an angle less than α, said plurality of Fresnel surface elements closer to said top surface than said bottom surface,
   wherein a height from a bottommost point of the angled facet portion to a topmost surface of the shallow portion of the plurality of Fresnel lens elements is on average less than about 5 microns.

21. The optical element of claim 20, wherein the height is on average from about 0.5 micron to less than about 5 microns.

22. An optical element comprising:
   a plurality of Fresnel lens elements spaced in a horizontal direction with respect to each other, said plurality of Fresnel lens elements comprising a plurality of indentations in a layer of material and a plurality an angled facet portions coinciding with said indentations and a plurality of substantially horizontal portions between said indentations,
   wherein said substantially horizontal portions have widths in the horizontal direction greater than an adjacent one of said angled facet portions, and
   wherein individual ones of said angled facet portions have a depth on average less than about 5 microns.

23. The optical element of claim 22, wherein the depth is on average from about 0.5 micron to less than about 5 microns.

24. The optical element of claim 22, wherein the depth is on average less than about 2.5 microns.

\* \* \* \* \*